(12) United States Patent
Bell et al.

(10) Patent No.: US 9,366,461 B2
(45) Date of Patent: Jun. 14, 2016

(54) SYSTEM AND METHOD FOR CLIMATE CONTROL WITHIN A PASSENGER COMPARTMENT OF A VEHICLE

(75) Inventors: Lon E. Bell, Altadena, CA (US); John LaGrandeur, Arcadia, CA (US)

(73) Assignee: Gentherm Incorporated, Northville, MI (US)

( * ) Notice: Subject to any disclaimer, the term of this patent is extended or adjusted under 35 U.S.C. 154(b) by 1304 days.

(21) Appl. No.: 12/614,278

(22) Filed: Nov. 6, 2009

(65) Prior Publication Data

US 2010/0052374 A1  Mar. 4, 2010

Related U.S. Application Data

(63) Continuation of application No. 12/126,423, filed on May 23, 2008.

(60) Provisional application No. 60/940,372, filed on May 25, 2007, provisional application No. 60/953,157, filed on Jul. 31, 2007.

(51) Int. Cl.
| | |
|---|---|
| *B60N 2/56* | (2006.01) |
| *F25B 21/04* | (2006.01) |
| *B60H 1/00* | (2006.01) |

(52) U.S. Cl.
CPC ............ *F25B 21/04* (2013.01); *B60H 1/00271* (2013.01); *B60H 1/00478* (2013.01);
(Continued)

(58) Field of Classification Search
CPC ............. F25B 2321/0252; F25B 21/04; F25B 2321/0251; B60H 1/00285; B60H 1/00478
USPC .............................................. 62/3.2, 3.61, 3.3
See application file for complete search history.

(56) References Cited

U.S. PATENT DOCUMENTS

| | | | |
|---|---|---|---|
| 413,136 | A | 10/1889 | Dewey |
| 1,120,781 | A | 12/1914 | Altenkirch et al. |

(Continued)

FOREIGN PATENT DOCUMENTS

| | | |
|---|---|---|
| CN | 1195090 | 10/1998 |
| CN | 1236429 A | 11/1999 |

(Continued)

OTHER PUBLICATIONS

Diller, R. W., et al.: "Experimental results confirming improved performance of systems using thermal isolation" Thermoelectrics, 2002. Proceedings ICT '02. Twenty-First International Conference on Aug. 25-29, 2002, Piscataway, NJ USA, IEEE, Aug. 25, 2002, pp. 548-550, XP010637541 ISBN: 0-7803-7683-8.

(Continued)

*Primary Examiner* — Cassey D Bauer
*Assistant Examiner* — Kirstin Oswald
(74) *Attorney, Agent, or Firm* — Knobbe, Martens, Olson & Bear, LLP

(57) ABSTRACT

A climate control system and method controls climate at selected regions within a passenger compartment of a vehicle. The thermoelectric system includes a plurality of thermoelectric assemblies. The system includes at least one fluid conduit configured to allow a liquid to flow in the at least one fluid conduit. The system further includes a plurality of thermoelectric assemblies. At least two thermoelectric assemblies of the plurality of thermoelectric assemblies are in thermal communication with the liquid and each of the at least two thermoelectric assemblies has a corresponding region within the passenger compartment. The at least two thermoelectric assemblies are selectively operable to transfer heat between the corresponding region and the liquid, wherein the at least two thermoelectric assemblies are each operable independently from one another.

45 Claims, 14 Drawing Sheets

(52) U.S. Cl.
CPC ..... *B60H1/00492* (2013.01); *F25B 2321/0251* (2013.01); *F25B 2321/0252* (2013.01); *F25B 2400/24* (2013.01)

(56) References Cited

U.S. PATENT DOCUMENTS

| | | |
|---|---|---|
| 2,363,168 A | 11/1944 | Findley |
| 2,499,901 A | 3/1950 | Brown, Jr. |
| 2,944,404 A | 7/1960 | Fritts |
| 2,949,014 A | 8/1960 | Belton, Jr. et al. |
| 2,984,077 A | 5/1961 | Gaskill |
| 2,992,538 A | 7/1961 | Siegfried |
| 2,997,514 A | 8/1961 | Roeder, Jr. |
| 3,004,393 A | 10/1961 | Alsing |
| 3,006,979 A | 10/1961 | Rich |
| 3,019,609 A | 2/1962 | Pietsch |
| 3,071,495 A | 1/1963 | Hanlein |
| 3,085,405 A | 4/1963 | Frantti |
| 3,125,860 A | 3/1964 | Reich |
| 3,136,577 A * | 6/1964 | Richard ................ 297/180.11 |
| 3,137,142 A | 6/1964 | Venema |
| 3,138,934 A | 6/1964 | Roane |
| 3,178,895 A | 4/1965 | Mole et al. |
| 3,196,620 A | 7/1965 | Elfving et al. |
| 3,197,342 A | 7/1965 | Neild, Jr. |
| 3,212,275 A | 10/1965 | Tillman, Jr. |
| 3,213,630 A | 10/1965 | Mole |
| 3,236,056 A | 2/1966 | Phillips et al. |
| 3,252,504 A * | 5/1966 | Newton ....................... 165/208 |
| 3,391,727 A | 7/1968 | Topouszian |
| 3,505,728 A | 4/1970 | Hare et al. |
| 3,522,106 A | 7/1970 | Debiesse et al. |
| 3,527,621 A | 9/1970 | Newton |
| 3,554,815 A | 1/1971 | Osborn |
| 3,599,437 A | 8/1971 | Panas |
| 3,607,444 A | 9/1971 | Debucs |
| 3,626,704 A | 12/1971 | Coe, Jr. |
| 3,635,037 A | 1/1972 | Hubert |
| 3,663,307 A | 5/1972 | Mole |
| 3,681,929 A | 8/1972 | Schering |
| 3,726,100 A | 4/1973 | Widakowich |
| 3,779,307 A | 12/1973 | Weiss et al. |
| 3,817,043 A | 6/1974 | Zoleta |
| 3,885,126 A | 5/1975 | Sugiyama et al. |
| 3,958,324 A | 5/1976 | Alais et al. |
| 4,038,831 A | 8/1977 | Gaudel et al. |
| 4,047,093 A | 9/1977 | Levoy |
| 4,051,691 A | 10/1977 | Dawkins |
| 4,055,053 A | 10/1977 | Elfving |
| 4,056,406 A | 11/1977 | Markman et al. |
| 4,065,936 A | 1/1978 | Fenton et al. |
| 4,125,122 A | 11/1978 | Stachurski |
| 4,193,271 A | 3/1980 | Honigsbaum |
| 4,280,330 A | 7/1981 | Harris et al. |
| 4,281,516 A | 8/1981 | Berthet et al. |
| 4,297,841 A | 11/1981 | Cheng |
| 4,297,849 A | 11/1981 | Buffet |
| 4,402,188 A | 9/1983 | Skala |
| 4,420,940 A | 12/1983 | Buffet |
| 4,444,851 A | 4/1984 | Maru |
| 4,448,028 A | 5/1984 | Chao et al. |
| 4,448,157 A * | 5/1984 | Eckstein et al. ....... 123/142.5 R |
| 4,494,380 A | 1/1985 | Cross |
| 4,499,329 A | 2/1985 | Benicourt et al. |
| 4,531,379 A * | 7/1985 | Diefenthaler, Jr. .............. 62/236 |
| 4,595,297 A | 6/1986 | Liu et al. |
| 4,634,803 A | 1/1987 | Mathiprakasam |
| 4,658,599 A | 4/1987 | Kajiwara |
| 4,665,707 A | 5/1987 | Hamilton |
| 4,665,971 A | 5/1987 | Sakurai |
| 4,707,995 A | 11/1987 | Assaf |
| 4,730,459 A | 3/1988 | Schicklin et al. |
| 4,753,682 A | 6/1988 | Cantoni |
| 4,802,929 A | 2/1989 | Schock |
| 4,823,554 A | 4/1989 | Trachtenberg et al. |
| 4,848,090 A | 7/1989 | Peters |
| 4,858,069 A | 8/1989 | Hughes |
| 4,905,475 A | 3/1990 | Tuomi |
| 4,907,060 A | 3/1990 | Nelson et al. |
| 4,922,721 A | 5/1990 | Robertson et al. |
| 4,922,998 A | 5/1990 | Carr |
| 4,947,735 A | 8/1990 | Guillemin |
| 4,988,847 A | 1/1991 | Argos et al. |
| 4,989,626 A | 2/1991 | Takagi et al. |
| 5,006,178 A | 4/1991 | Bijvoets |
| 5,029,446 A | 7/1991 | Suzuki |
| 5,038,569 A | 8/1991 | Shirota et al. |
| 5,042,566 A | 8/1991 | Hildebrand |
| 5,092,129 A | 3/1992 | Bayes et al. |
| 5,097,829 A | 3/1992 | Quisenberry |
| 5,111,664 A | 5/1992 | Yang |
| 5,119,640 A | 6/1992 | Conrad |
| 5,167,129 A | 12/1992 | Akasaka |
| 5,171,372 A | 12/1992 | Recine, Sr. |
| 5,180,293 A | 1/1993 | Hartl |
| 5,193,347 A | 3/1993 | Apisdorf |
| 5,198,930 A | 3/1993 | Muratomi |
| 5,228,923 A | 7/1993 | Hed |
| 5,232,516 A | 8/1993 | Hed |
| 5,254,178 A | 10/1993 | Yamada et al. |
| 5,269,146 A | 12/1993 | Kerner |
| 5,291,960 A | 3/1994 | Brandenburg et al. |
| 5,300,197 A | 4/1994 | Mitani et al. |
| 5,303,771 A | 4/1994 | Des Champs |
| 5,316,078 A | 5/1994 | Cesaroni |
| 5,385,020 A | 1/1995 | Gwilliam et al. |
| 5,386,823 A | 2/1995 | Chen |
| 5,407,130 A * | 4/1995 | Uyeki et al. .............. 237/12.3 B |
| 5,419,780 A | 5/1995 | Suski |
| 5,419,980 A | 5/1995 | Okamoto et al. |
| 5,429,680 A | 7/1995 | Fuschetti |
| 5,430,322 A | 7/1995 | Koyanagi et al. |
| 5,431,021 A | 7/1995 | Gwilliam et al. |
| 5,448,891 A | 9/1995 | Nakagiri et al. |
| 5,450,894 A | 9/1995 | Inoue et al. |
| 5,456,081 A | 10/1995 | Chrysler et al. |
| 5,483,807 A | 1/1996 | Abersfelder et al. |
| 5,497,625 A * | 3/1996 | Manz et al. ....................... 62/3.3 |
| 5,499,504 A | 3/1996 | Mill et al. |
| 5,544,487 A | 8/1996 | Attey et al. |
| 5,549,153 A | 8/1996 | Baruschke et al. |
| 5,561,981 A | 10/1996 | Quisenberry et al. |
| 5,566,774 A | 10/1996 | Yoshida |
| 5,576,512 A | 11/1996 | Doke |
| 5,584,183 A | 12/1996 | Wright et al. |
| 5,592,363 A | 1/1997 | Atarashi et al. |
| 5,594,609 A | 1/1997 | Lin |
| 5,605,047 A | 2/1997 | Park et al. |
| 5,653,111 A | 8/1997 | Attey et al. |
| 5,673,964 A | 10/1997 | Roan et al. |
| 5,682,748 A | 11/1997 | DeVilbiss et al. |
| 5,694,770 A | 12/1997 | Bruck et al. |
| 5,705,770 A | 1/1998 | Ogassawara et al. |
| 5,713,426 A | 2/1998 | Okamura |
| 5,722,249 A | 3/1998 | Miller, Jr. |
| 5,724,818 A | 3/1998 | Iwata et al. |
| 5,725,048 A | 3/1998 | Burk et al. |
| 5,802,856 A | 9/1998 | Schaper et al. |
| 5,816,236 A | 10/1998 | Moroi et al. |
| 5,822,993 A | 10/1998 | Attey |
| 5,860,472 A | 1/1999 | Batchelder |
| 5,867,990 A | 2/1999 | Ghoshal |
| 5,890,371 A | 4/1999 | Rajasubramanian et al. |
| 5,899,086 A | 5/1999 | Noda et al. |
| 5,901,572 A | 5/1999 | Peiffer et al. |
| RE36,242 E | 6/1999 | Apisdorf |
| 5,917,144 A | 6/1999 | Miyake et al. |
| 5,918,930 A | 7/1999 | Kawai et al. |
| 5,921,088 A | 7/1999 | Imaizumi et al. |
| 5,955,772 A | 9/1999 | Shakouri et al. |
| 5,959,341 A | 9/1999 | Tsuno et al. |
| 5,964,092 A | 10/1999 | Tozuka et al. |
| 5,966,941 A | 10/1999 | Ghoshal |
| 5,975,856 A | 11/1999 | Welle |

(56) References Cited

U.S. PATENT DOCUMENTS

| | | | |
|---|---|---|---|
| 5,977,785 A | 11/1999 | Burward-Hoy |
| 5,987,890 A | 11/1999 | Chiu et al. |
| 6,000,225 A | 12/1999 | Choshal |
| 6,028,263 A | 2/2000 | Kobayashi et al. |
| 6,050,326 A | 4/2000 | Evans |
| 6,059,198 A | 5/2000 | Moroi et al. |
| 6,082,445 A | 7/2000 | Dugan |
| 6,084,172 A | 7/2000 | Kishi et al. |
| 6,096,966 A | 8/2000 | Nishimoto et al. |
| 6,105,659 A | 8/2000 | Pocol et al. |
| 6,119,463 A | 9/2000 | Bell |
| 6,122,588 A | 9/2000 | Shehan et al. |
| 6,127,766 A | 10/2000 | Roidt |
| 6,138,749 A | 10/2000 | Kawai et al. |
| 6,158,225 A | 12/2000 | Muto et al. |
| 6,203,939 B1 | 3/2001 | Wilson |
| 6,205,802 B1 | 3/2001 | Drucker et al. |
| 6,205,805 B1 | 3/2001 | Takahashi et al. |
| 6,213,198 B1 | 4/2001 | Shikata et al. |
| 6,223,539 B1 | 5/2001 | Bell |
| 6,226,994 B1 * | 5/2001 | Yamada et al. ............ 62/3.7 |
| 6,230,496 B1 | 5/2001 | Hofmann et al. |
| 6,270,015 B1 | 8/2001 | Hirota |
| 6,282,907 B1 | 9/2001 | Ghoshal |
| 6,293,107 B1 | 9/2001 | Kitagawa |
| 6,302,196 B1 | 10/2001 | Haussmann |
| 6,320,280 B1 | 11/2001 | Kanesaka |
| 6,324,860 B1 | 12/2001 | Maeda et al. |
| 6,334,311 B1 | 1/2002 | Kim et al. |
| 6,346,668 B1 | 2/2002 | McGrew |
| 6,347,521 B1 | 2/2002 | Kadotani et al. |
| 6,357,518 B1 | 3/2002 | Sugimoto et al. |
| 6,366,832 B2 | 4/2002 | Lomonaco et al. |
| 6,385,976 B1 | 5/2002 | Yamamura et al. |
| 6,393,842 B2 | 5/2002 | Kim |
| 6,401,462 B1 | 6/2002 | Bielinski |
| 6,407,435 B1 | 6/2002 | Ma et al. |
| 6,412,287 B1 | 7/2002 | Hughes et al. |
| 6,431,257 B1 | 8/2002 | Sano et al. |
| 6,438,964 B1 | 8/2002 | Giblin |
| 6,446,442 B1 | 9/2002 | Batchelor et al. |
| 6,453,993 B1 * | 9/2002 | Bujak, Jr. ............... 165/208 |
| 6,457,324 B2 | 10/2002 | Zeigler et al. |
| 6,464,027 B1 | 10/2002 | Dage et al. |
| 6,474,073 B1 | 11/2002 | Uetsuji et al. |
| 6,474,081 B1 | 11/2002 | Feuerecker |
| 6,477,844 B2 | 11/2002 | Ohkubo et al. |
| 6,481,213 B2 | 11/2002 | Carr et al. |
| 6,499,306 B2 | 12/2002 | Gillen |
| 6,510,696 B2 | 1/2003 | Guttman et al. |
| 6,530,231 B1 | 3/2003 | Nagy et al. |
| 6,530,920 B1 | 3/2003 | Whitcroft et al. |
| 6,539,725 B2 | 4/2003 | Bell |
| 6,539,729 B2 | 4/2003 | Tupis et al. |
| 6,541,139 B2 | 4/2003 | Cibuzar |
| 6,548,750 B1 | 4/2003 | Picone |
| 6,554,088 B2 | 4/2003 | Severinsky et al. |
| 6,560,968 B2 | 5/2003 | Ko |
| 6,563,039 B2 | 5/2003 | Caillat et al. |
| 6,569,550 B2 | 5/2003 | Khelifa |
| RE38,128 E | 6/2003 | Gallup et al. |
| 6,580,025 B2 | 6/2003 | Guy |
| 6,598,403 B1 | 7/2003 | Ghoshal |
| 6,598,405 B2 | 7/2003 | Bell |
| 6,605,773 B2 | 8/2003 | Kok |
| 6,606,866 B2 | 8/2003 | Bell |
| 6,606,877 B2 | 8/2003 | Tomita et al. |
| 6,607,142 B1 * | 8/2003 | Boggs et al. ........... 237/12.3 B |
| 6,611,115 B2 | 8/2003 | Wakashiro et al. |
| 6,625,990 B2 | 9/2003 | Bell |
| 6,637,210 B2 | 10/2003 | Bell |
| 6,640,889 B1 | 11/2003 | Harte et al. |
| 6,653,002 B1 | 11/2003 | Parise |
| 6,672,076 B2 | 1/2004 | Bell |
| 6,682,844 B2 | 1/2004 | Gene |
| 6,700,052 B2 | 3/2004 | Bell |
| 6,705,089 B2 | 3/2004 | Chu et al. |
| 6,722,139 B2 | 4/2004 | Moon et al. |
| 6,732,534 B2 | 5/2004 | Spry |
| 6,779,348 B2 | 8/2004 | Taban |
| 6,792,259 B1 | 9/2004 | Parise |
| 6,796,399 B2 | 9/2004 | Satou et al. |
| 6,803,766 B2 | 10/2004 | Kobayashi et al. |
| 6,807,811 B2 | 10/2004 | Lee |
| 6,810,977 B2 | 11/2004 | Suzuki |
| 6,812,395 B2 | 11/2004 | Bell |
| 6,862,892 B1 | 3/2005 | Meyer et al. |
| 6,880,346 B1 | 4/2005 | Tseng et al. |
| 6,883,602 B2 | 4/2005 | Drucker |
| 6,886,356 B2 | 5/2005 | Kubo et al. |
| 6,894,369 B2 | 5/2005 | Irino et al. |
| 6,896,047 B2 | 5/2005 | Currle et al. |
| 6,907,739 B2 | 6/2005 | Bell |
| 6,910,345 B2 * | 6/2005 | Horstmann et al. ......... 62/238.6 |
| 6,915,641 B2 | 7/2005 | Harvie |
| 6,942,728 B2 | 9/2005 | Caillat et al. |
| 6,948,321 B2 | 9/2005 | Bell |
| 6,959,555 B2 | 11/2005 | Bell |
| 6,962,195 B2 | 11/2005 | Smith et al. |
| 6,973,799 B2 | 12/2005 | Kuehl et al. |
| 6,975,060 B2 | 12/2005 | Styblo et al. |
| 6,986,247 B1 | 1/2006 | Parise |
| 7,007,491 B2 | 3/2006 | Grimm et al. |
| 7,074,122 B2 | 7/2006 | Haupt et al. |
| 7,089,756 B2 | 8/2006 | Hu |
| 7,100,369 B2 | 9/2006 | Yamaguchi et al. |
| 7,111,465 B2 | 9/2006 | Bell |
| 7,134,288 B2 | 11/2006 | Crippen et al. |
| 7,171,955 B2 | 2/2007 | Perkins |
| 7,231,772 B2 | 6/2007 | Bell |
| 7,235,735 B2 | 6/2007 | Venkatasubramanian et al. |
| 7,246,496 B2 | 7/2007 | Goenka et al. |
| 7,310,953 B2 | 12/2007 | Pham et al. |
| 7,363,766 B2 * | 4/2008 | Eisenhour ............ 62/3.61 |
| 7,380,586 B2 | 6/2008 | Gawthrop |
| 7,416,138 B2 | 8/2008 | Ellison et al. |
| 7,421,845 B2 | 9/2008 | Bell |
| 7,426,835 B2 | 9/2008 | Bell |
| 7,475,551 B2 * | 1/2009 | Ghoshal ............ 62/3.2 |
| 7,587,902 B2 | 9/2009 | Bell |
| 7,650,757 B2 | 1/2010 | Bhatti |
| 7,743,614 B2 | 6/2010 | Goenka et al. |
| 7,779,639 B2 | 8/2010 | Goenka |
| 7,784,289 B2 | 8/2010 | Scherer et al. |
| 7,788,933 B2 | 9/2010 | Goenka |
| 7,870,745 B2 | 1/2011 | Goenka |
| 7,870,892 B2 | 1/2011 | Gawthrop |
| 7,905,278 B2 | 3/2011 | Sato et al. |
| 7,926,293 B2 | 4/2011 | Bell |
| 7,932,460 B2 | 4/2011 | Bell |
| 7,942,010 B2 | 5/2011 | Bell |
| 7,946,120 B2 | 5/2011 | Bell |
| 8,069,674 B2 | 12/2011 | Bell |
| 8,079,223 B2 | 12/2011 | Bell |
| 8,104,294 B2 | 1/2012 | Reeve |
| 8,261,868 B2 | 9/2012 | Goenka et al. |
| 8,359,871 B2 | 1/2013 | Woods et al. |
| 8,408,012 B2 | 4/2013 | Goenka et al. |
| 8,490,412 B2 | 7/2013 | Bell et al. |
| 8,495,884 B2 | 7/2013 | Bell et al. |
| 8,613,200 B2 | 12/2013 | LaGrandeur et al. |
| 8,631,659 B2 | 1/2014 | Goenka |
| 8,640,466 B2 | 2/2014 | Bell et al. |
| 8,701,422 B2 | 4/2014 | Bell et al. |
| 8,915,091 B2 | 12/2014 | Goenka |
| 2001/0029974 A1 | 10/2001 | Cohen et al. |
| 2002/0095943 A1 | 7/2002 | Hatakeyama et al. |
| 2003/0029175 A1 | 2/2003 | Lee |
| 2003/0084935 A1 | 5/2003 | Bell |
| 2003/0094265 A1 | 5/2003 | Chu et al. |
| 2003/0106677 A1 | 6/2003 | Memory et al. |
| 2003/0140636 A1 | 7/2003 | Van Winkle |
| 2003/0145605 A1 * | 8/2003 | Moon et al. ............ 62/3.2 |
| 2003/0217738 A1 * | 11/2003 | Ryon ............ 123/541 |

(56) References Cited

U.S. PATENT DOCUMENTS

| | | | |
|---|---|---|---|
| 2004/0025516 A1* | 2/2004 | Van Winkle | 62/3.3 |
| 2004/0045594 A1 | 3/2004 | Hightower | |
| 2004/0050076 A1 | 3/2004 | Palfy et al. | |
| 2004/0055312 A1 | 3/2004 | Bell | |
| 2004/0076214 A1 | 4/2004 | Bell et al. | |
| 2004/0089336 A1 | 5/2004 | Hunt | |
| 2004/0093889 A1 | 5/2004 | Bureau et al. | |
| 2004/0098991 A1 | 5/2004 | Heyes | |
| 2004/0177876 A1 | 9/2004 | Hightower | |
| 2004/0221577 A1 | 11/2004 | Yamaguchi et al. | |
| 2004/0237541 A1 | 12/2004 | Murphy | |
| 2004/0261829 A1 | 12/2004 | Bell | |
| 2004/0267408 A1 | 12/2004 | Kramer | |
| 2005/0000473 A1 | 1/2005 | Ap et al. | |
| 2005/0011199 A1 | 1/2005 | Grisham et al. | |
| 2005/0061497 A1 | 3/2005 | Amaral | |
| 2005/0067862 A1 | 3/2005 | Iqbal et al. | |
| 2005/0074646 A1 | 4/2005 | Rajashekara et al. | |
| 2005/0081834 A1 | 4/2005 | Perkins | |
| 2005/0121065 A1 | 6/2005 | Otey | |
| 2005/0133206 A1* | 6/2005 | Scott | 165/122 |
| 2005/0139692 A1 | 6/2005 | Yamamoto | |
| 2005/0178128 A1 | 8/2005 | Harwood et al. | |
| 2005/0247336 A1 | 11/2005 | Inaoka | |
| 2005/0257531 A1 | 11/2005 | Kadle et al. | |
| 2005/0257545 A1 | 11/2005 | Ziehr et al. | |
| 2005/0263176 A1 | 12/2005 | Yamaguchi et al. | |
| 2005/0268621 A1 | 12/2005 | Kadle et al. | |
| 2005/0278863 A1 | 12/2005 | Bahash et al. | |
| 2005/0279105 A1 | 12/2005 | Pastorino | |
| 2006/0011152 A1* | 1/2006 | Hayes | 123/41.49 |
| 2006/0059933 A1 | 3/2006 | Axakov et al. | |
| 2006/0075758 A1* | 4/2006 | Rice et al. | 62/3.3 |
| 2006/0080979 A1 | 4/2006 | Kitanovski et al. | |
| 2006/0086118 A1 | 4/2006 | Venkatasubramanian et al. | |
| 2006/0124165 A1 | 6/2006 | Bierschenk et al. | |
| 2006/0130490 A1* | 6/2006 | Petrovski | 62/3.3 |
| 2006/0137358 A1 | 6/2006 | Feher | |
| 2006/0150657 A1 | 7/2006 | Spurgeon et al. | |
| 2006/0168969 A1 | 8/2006 | Mei et al. | |
| 2006/0174633 A1 | 8/2006 | Beckley | |
| 2006/0188418 A1 | 8/2006 | Park et al. | |
| 2006/0219281 A1 | 10/2006 | Kuroyanagi et al. | |
| 2006/0225441 A1 | 10/2006 | Goenka et al. | |
| 2006/0254284 A1 | 11/2006 | Ito et al. | |
| 2006/0254285 A1 | 11/2006 | Lin | |
| 2007/0000255 A1 | 1/2007 | Elliot et al. | |
| 2007/0017666 A1 | 1/2007 | Goenka et al. | |
| 2007/0033951 A1 | 2/2007 | Goenka et al. | |
| 2007/0056295 A1 | 3/2007 | De Vilbiss | |
| 2007/0125413 A1 | 6/2007 | Olsen et al. | |
| 2007/0214799 A1 | 9/2007 | Goenka | |
| 2007/0220902 A1 | 9/2007 | Matsuoka et al. | |
| 2007/0261729 A1 | 11/2007 | Hu | |
| 2007/0272290 A1 | 11/2007 | Sims et al. | |
| 2008/0017362 A1 | 1/2008 | Kwon et al. | |
| 2008/0028768 A1 | 2/2008 | Goenka | |
| 2008/0028769 A1 | 2/2008 | Goenka | |
| 2008/0090137 A1 | 4/2008 | Buck et al. | |
| 2008/0115818 A1 | 5/2008 | Cheng et al. | |
| 2008/0230618 A1 | 9/2008 | Gawthrop | |
| 2008/0250794 A1 | 10/2008 | Bell | |
| 2008/0289677 A1 | 11/2008 | Bell | |
| 2008/0307796 A1 | 12/2008 | Bell et al. | |
| 2009/0000310 A1 | 1/2009 | Bell et al. | |
| 2009/0007572 A1 | 1/2009 | Bell et al. | |
| 2009/0007952 A1 | 1/2009 | Kondoh et al. | |
| 2009/0118869 A1 | 5/2009 | Cauchy et al. | |
| 2009/0133734 A1 | 5/2009 | Takahashi et al. | |
| 2009/0293499 A1 | 12/2009 | Bell et al. | |
| 2009/0301103 A1 | 12/2009 | Bell et al. | |
| 2010/0031987 A1 | 2/2010 | Bell | |
| 2010/0031988 A1 | 2/2010 | Bell | |
| 2010/0052374 A1 | 3/2010 | Bell et al. | |
| 2010/0101238 A1 | 4/2010 | LaGrandeur et al. | |
| 2010/0101239 A1 | 4/2010 | LaGrandeur et al. | |
| 2010/0112419 A1 | 5/2010 | Jang et al. | |
| 2010/0155018 A1 | 6/2010 | Goenka et al. | |
| 2010/0287952 A1 | 11/2010 | Goenka | |
| 2010/0291414 A1 | 11/2010 | Bell et al. | |
| 2010/0313576 A1 | 12/2010 | Goenka | |
| 2010/0326092 A1 | 12/2010 | Goenka | |
| 2010/0331657 A1 | 12/2010 | Mensinger et al. | |
| 2011/0067742 A1 | 3/2011 | Bell et al. | |
| 2011/0079023 A1 | 4/2011 | Goenka et al. | |
| 2011/0107772 A1 | 5/2011 | Goenka | |
| 2011/0107773 A1 | 5/2011 | Gawthrop | |
| 2011/0162389 A1 | 7/2011 | Bell | |
| 2011/0185715 A1 | 8/2011 | Limbeck et al. | |
| 2011/0209740 A1 | 9/2011 | Bell et al. | |
| 2011/0236731 A1 | 9/2011 | Bell et al. | |
| 2011/0244300 A1 | 10/2011 | Closek et al. | |
| 2011/0247668 A1 | 10/2011 | Bell et al. | |
| 2011/0258995 A1 | 10/2011 | Limbeck et al. | |
| 2011/0271994 A1 | 11/2011 | Gilley | |
| 2012/0102934 A1 | 5/2012 | Magnetto | |
| 2012/0111386 A1 | 5/2012 | Bell et al. | |
| 2012/0174567 A1 | 7/2012 | Limbeck et al. | |
| 2012/0177864 A1 | 7/2012 | Limbeck et al. | |
| 2012/0266608 A1 | 10/2012 | Kadle et al. | |
| 2013/0037073 A1 | 2/2013 | LaGrandeur | |
| 2013/0059190 A1 | 3/2013 | Kossakovski et al. | |
| 2013/0068273 A1 | 3/2013 | Kanno et al. | |
| 2013/0104953 A1 | 5/2013 | Poliquin et al. | |
| 2013/0160809 A1 | 6/2013 | Mueller | |
| 2013/0167894 A1 | 7/2013 | Brueck et al. | |
| 2013/0174579 A1 | 7/2013 | Goenka et al. | |
| 2013/0186448 A1 | 7/2013 | Ranalli et al. | |
| 2013/0192271 A1 | 8/2013 | Ranalli et al. | |
| 2013/0192272 A1 | 8/2013 | Ranalli et al. | |
| 2013/0255739 A1 | 10/2013 | Kossakovski et al. | |
| 2013/0317728 A1 | 11/2013 | Hall et al. | |
| 2013/0327063 A1 | 12/2013 | Gawthrop | |
| 2014/0034102 A1 | 2/2014 | Ranalli et al. | |
| 2014/0060086 A1 | 3/2014 | Ranalli | |
| 2014/0096807 A1 | 4/2014 | Ranalli | |
| 2014/0325997 A1 | 11/2014 | Bell | |

FOREIGN PATENT DOCUMENTS

| | | |
|---|---|---|
| CN | 1249067 A | 3/2000 |
| DE | 13 01 454 | 8/1969 |
| DE | 23 19155 | 10/1974 |
| DE | 43 29 816 | 3/1994 |
| DE | 197 30 678 | 1/1999 |
| DE | 198 29 440 A1 | 1/2000 |
| DE | 199 51 224 | 5/2001 |
| DE | 20 105 487 | 10/2001 |
| DE | 10 2009 003 737 | 10/2010 |
| DE | 10 2010 012 629 | 9/2011 |
| EP | 0 389 407 | 9/1990 |
| EP | 0418995 B1 | 3/1991 |
| EP | 0 545 021 | 6/1993 |
| EP | 0 791 497 | 8/1997 |
| EP | 0 834 421 | 4/1998 |
| EP | 1 174 996 | 1/2002 |
| EP | 1 324 400 A | 7/2003 |
| EP | 1 475 532 A | 11/2004 |
| EP | 1 515 376 | 3/2005 |
| EP | 1641067 A1 | 3/2006 |
| EP | 1 780 807 | 5/2007 |
| EP | 1 906 463 A2 | 4/2008 |
| EP | 1 932 695 A1 | 6/2008 |
| EP | 2 541 634 | 1/2013 |
| EP | 2 313 938 B1 | 10/2013 |
| FR | 1 280 711 A | 1/1962 |
| FR | 2 316 557 | 1/1977 |
| FR | 2 419 479 A | 10/1979 |
| FR | 2 481 786 | 11/1981 |
| FR | 2543275 | 9/1984 |
| FR | 2 550 324 A | 2/1985 |
| FR | 2806666 | 9/2001 |
| GB | 231 192 A | 5/1926 |
| GB | 817 077 | 7/1959 |

(56) References Cited

FOREIGN PATENT DOCUMENTS

| | | |
|---|---|---|
| GB | 952 678 | 3/1964 |
| GB | 1 040 485 | 8/1966 |
| GB | 1151947 | 5/1969 |
| GB | 2 027 534 | 2/1980 |
| GB | 2 267 338 | 12/1993 |
| GB | 2 333 352 | 7/1999 |
| JP | 39-27735 | 12/1964 |
| JP | 56-18231 | 2/1981 |
| JP | 59097457 | 6/1984 |
| JP | 60-80044 | 7/1985 |
| JP | 63-262076 A | 10/1988 |
| JP | 01 131830 A | 5/1989 |
| JP | 01 200122 | 8/1989 |
| JP | 01 281344 | 11/1989 |
| JP | 03-263382 | 11/1991 |
| JP | 04 103925 | 4/1992 |
| JP | 4-165234 | 6/1992 |
| JP | 04-165234 | 6/1992 |
| JP | 05-037521 U | 5/1993 |
| JP | 05-037621 U | 5/1993 |
| JP | 6-024235 | 2/1994 |
| JP | 06-089955 | 3/1994 |
| JP | 06-135218 A | 5/1994 |
| JP | 6-342940 | 12/1994 |
| JP | 7-198284 | 1/1995 |
| JP | A-7-7187 | 1/1995 |
| JP | 07-074397 | 3/1995 |
| JP | 07-089334 A | 4/1995 |
| JP | 09-321355 | 5/1995 |
| JP | 07-54189 | 6/1995 |
| JP | 7 156645 | 6/1995 |
| JP | A-7-202275 | 8/1995 |
| JP | 07-253224 | 10/1995 |
| JP | 07-253264 | 2/1996 |
| JP | 08-222771 | 8/1996 |
| JP | 08-316388 | 11/1996 |
| JP | A-8-293627 | 11/1996 |
| JP | 09042801 | 2/1997 |
| JP | 9-089284 A | 4/1997 |
| JP | 09-092761 | 4/1997 |
| JP | 09-254630 | 9/1997 |
| JP | 09-276076 A | 10/1997 |
| JP | 9276076 | 10/1997 |
| JP | 10 012935 | 1/1998 |
| JP | 10035268 | 2/1998 |
| JP | H10-325561 | 8/1998 |
| JP | 10238406 A | 9/1998 |
| JP | 10-275943 | 10/1998 |
| JP | 10290590 | 10/1998 |
| JP | 11-317481 | 11/1998 |
| JP | 11-032492 | 2/1999 |
| JP | 11-042933 A | 2/1999 |
| JP | 11 046021 | 2/1999 |
| JP | 11-182907 | 7/1999 |
| JP | 11-201475 A | 7/1999 |
| JP | 11-274575 | 10/1999 |
| JP | 11-301254 A | 11/1999 |
| JP | 11-342731 | 12/1999 |
| JP | 2000 018095 | 1/2000 |
| JP | H2000-58930 | 2/2000 |
| JP | 2000 130883 | 5/2000 |
| JP | 2000-161721 | 6/2000 |
| JP | 00 208823 | 7/2000 |
| JP | 2000-185542 | 7/2000 |
| JP | 2000-208823 A | 7/2000 |
| JP | H2000-214934 | 8/2000 |
| JP | 2000-274788 | 10/2000 |
| JP | 2000-274871 A | 10/2000 |
| JP | 2000-274874 | 10/2000 |
| JP | 2000-318434 | 11/2000 |
| JP | 01 007263 A | 1/2001 |
| JP | 2001-24240 | 1/2001 |
| JP | 2001 210879 | 8/2001 |
| JP | 2001-267642 A | 9/2001 |
| JP | 2001304778 | 10/2001 |
| JP | 2001-336853 | 1/2002 |
| JP | 2002-13758 | 1/2002 |
| JP | 2002059736 A | 2/2002 |
| JP | 2002 232028 A | 8/2002 |
| JP | 2003175720 A | 6/2003 |
| JP | 2003-237357 A | 8/2003 |
| JP | 2003 259671 | 9/2003 |
| JP | 2003 332642 | 11/2003 |
| JP | 2004 050874 | 2/2004 |
| JP | 2004 079883 | 3/2004 |
| JP | 2004 360522 | 12/2004 |
| JP | 2005-212564 | 8/2005 |
| JP | 2005-302851 A | 10/2005 |
| JP | 2005-212564 | 11/2005 |
| JP | 2005 317648 | 11/2005 |
| JP | 2006 015965 | 1/2006 |
| JP | 2007-161110 A | 6/2007 |
| JP | 2008-094366 A | 4/2008 |
| JP | 2008 274790 | 11/2008 |
| JP | 2008 300465 | 12/2008 |
| JP | 2009-010138 | 1/2009 |
| JP | 2009 033806 | 2/2009 |
| KR | 2001 111646 | 12/2001 |
| KR | 10-2002-0057600 | 7/2002 |
| KR | 10-2011-0013876 | 2/2011 |
| LU | 66619 | 2/1973 |
| RU | 2 142 178 | 11/1999 |
| RU | 2 154 875 C2 | 8/2000 |
| SE | 337 227 | 5/1971 |
| SU | 184886 | 7/1966 |
| SU | 1142711 A | 2/1985 |
| SU | 1196627 A | 12/1985 |
| WO | WO 95/01500 | 1/1995 |
| WO | WO 96/05475 | 2/1996 |
| WO | WO 9722486 A1 | 6/1997 |
| WO | WO 97/47930 | 12/1997 |
| WO | WO 9856047 A1 | 12/1998 |
| WO | WO 99/09360 A1 | 2/1999 |
| WO | WO 99/10191 | 3/1999 |
| WO | WO 99/58907 | 11/1999 |
| WO | WO 03/014634 | 2/2003 |
| WO | WO 03/074951 A1 | 9/2003 |
| WO | WO 03/090286 A | 10/2003 |
| WO | WO 2004/019379 A | 3/2004 |
| WO | WO 2005/023571 | 3/2005 |
| WO | WO 2005/020340 A | 5/2005 |
| WO | WO 2005/063567 | 7/2005 |
| WO | WO 2005/098225 A | 10/2005 |
| WO | WO 2006/001827 | 1/2006 |
| WO | WO 2006/037178 A | 4/2006 |
| WO | WO 2006/043514 A | 4/2006 |
| WO | WO 2007/001289 | 1/2007 |
| WO | WO 2007/021273 A1 | 2/2007 |
| WO | WO 2007/109368 | 9/2007 |
| WO | WO 2008/013946 A2 | 1/2008 |
| WO | WO 2008/042077 | 4/2008 |
| WO | WO 2008/147305 | 4/2008 |
| WO | WO 2008/147305 A1 | 4/2008 |
| WO | WO 2008/091293 A2 | 7/2008 |
| WO | WO 2008/123663 | 10/2008 |
| WO | WO 2012/031980 | 3/2012 |
| WO | WO 2012/045542 | 4/2012 |

OTHER PUBLICATIONS

Diller, R.W., et al., "Experimental Results Confirming Improved Efficiency of Thermoelectric Power Generation Systems with Alternate Thermodynamic Cycles," 22nd International Conference on Thermoelectrics, 2003, pp. 571-573.

Hendricks, Terry et al., "Advanced Thermoelectric Power System Investigations for Light-Duty and Heavy Duty Applications," National Renewable Energy Laboratory, Center for Transportation Technology & Systems, Colorado, 2002.

International Search Report and Written Opinion for International Application No. PCT/US2008/064763 mailed on Dec. 5, 2008 in 22 pages.

Lofy, John et al., "Thermoelectrics for Environmental Control Automobiles," 21st International Conference on Thermoelectronics, 2002, p. 471-476.

(56) References Cited

OTHER PUBLICATIONS

Menchen, William R., et al., "Thermoelectric Conversion to Recover Heavy Duty Diesel Exhaust Energy," Teledyne Energy Systems, Timonium, MD 1990.

Miner, A., et al. "Thermo-Electro-Mechanical Refrigeration Based on Transient Thermoelectric Effects", Applied Physics letters, vol. 75, pp. 1176-1178 (1999).

Snyder, G. Jeffrey, et al., "Thermoelectric Effciency and Compatibility," The American Physical Society, Oct. 2, 2003, vol. 91, No. 14.

Tada, S., et al., "A New Concept of Porous Thermoelectric Module Using a Reciprocating Flow for Cooling/Heating Systems (Numerical Analysis for Heating Systems)" 16th International Conference on Thermoelectrics (1977).

Derwent-Acc-No. 1998-283540, Kwon, H et al., Hyundai Motor Co., corresponding to KR 97026106 A, published Jun. 24, 1997 (2 pages).

Funahashi et al., "Preparation and properties of thermoelectric pipe-type modules", ICT 25th International Conference on Aug. 6-10, 2006, Thermoelectrics, 2006, pp. 58-61.

Min et al., "Ring-structured thermoelectric module", Semiconductor Science and Technology, Aug. 2007, vol. 22, No. 8, pp. 880-888.

Thermoelectrics Handbook: Macro to Nano, 2006, Chpt. 11, Section 11.7, pp. 11-11 to 11-15, CRC Press, Boca Raton, FL.

Heckenberger, Thomas, "Li-on Battery Cooling," BEHR Power Point Presentation, Technical Press Day, Stuttgart, May 20, 2009, 13 pages.

Stockholm, John G.: "Large-Scale Cooling: Integrated Thermoelectric Element Technology," CRC Handbook of Thermoelectrics, Chapter 53, pp. 657-666. 0-8493-0146, Jul. 1995.

\* cited by examiner

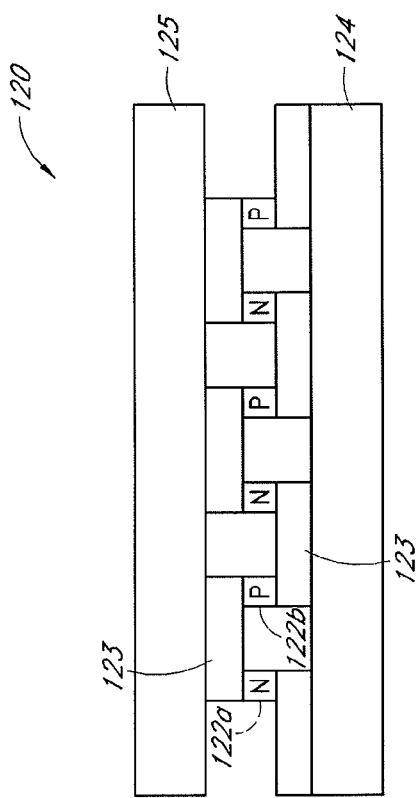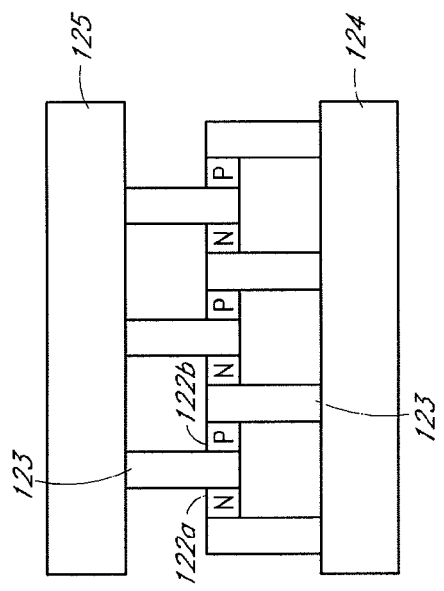

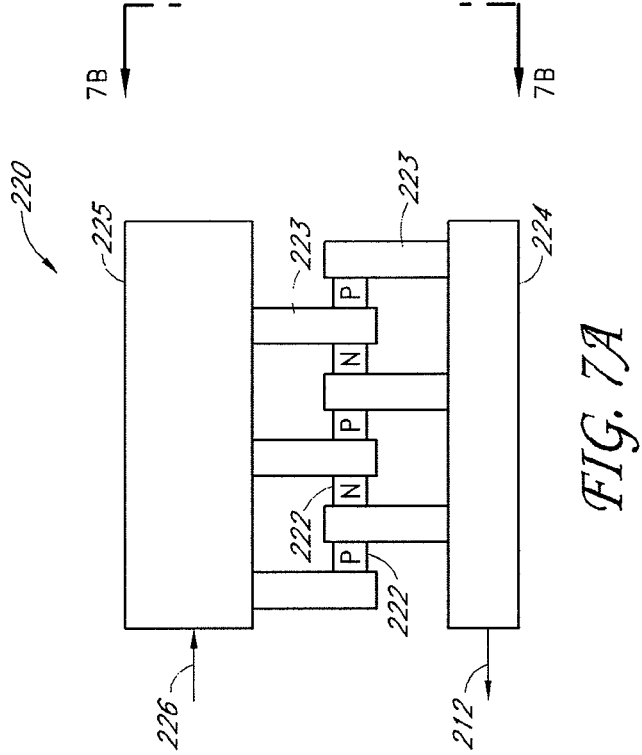
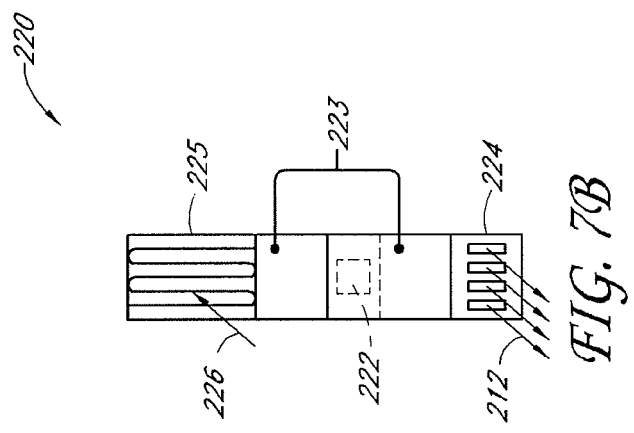
FIG. 7A
FIG. 7B

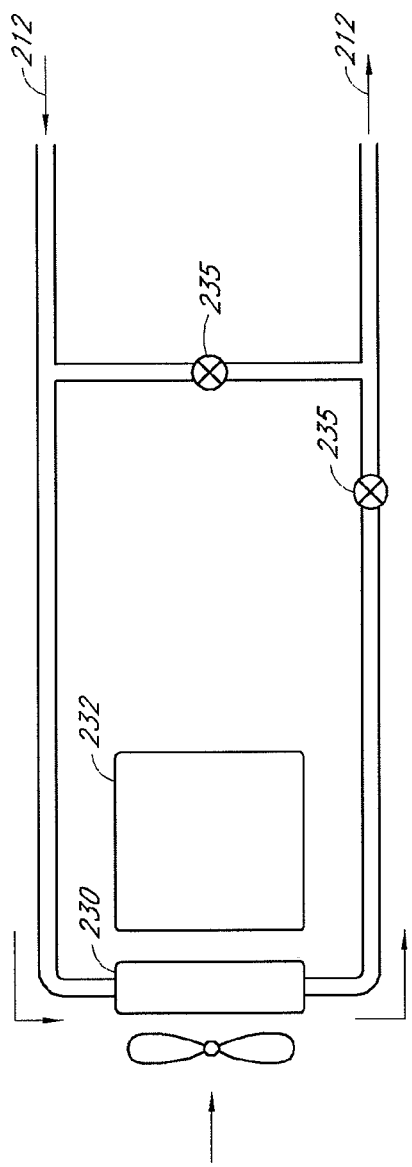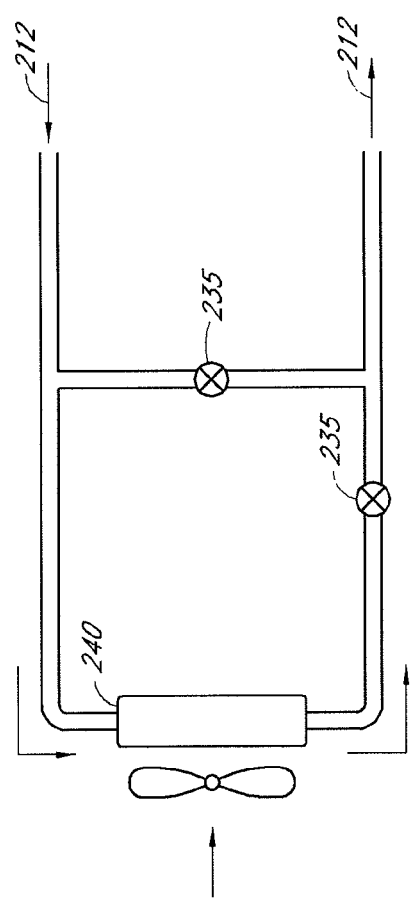
FIG. 8
FIG. 9

SYSTEM AND METHOD FOR CLIMATE CONTROL WITHIN A PASSENGER COMPARTMENT OF A VEHICLE

CROSS-REFERENCE TO RELATED APPLICATIONS

This application is a continuation of U.S. patent application Ser. No. 12/126,423, filed May 23, 2008, which is incorporated in its entirety by reference herein, which claims the benefit of U.S. Provisional Appl. No. 60/940,372, filed May 25, 2007, which is incorporated in its entirety by reference herein, and U.S. Provisional Appl. No. 60/953,157, filed Jul. 31, 2007, which is incorporated in its entirety by reference herein.

BACKGROUND

1. Field of the Invention

The present application relates generally to the field of ventilating, heating, and cooling systems for the creation and distribution of comfort air and the thermal management of sensitive systems for which temperature control is important.

2. Description of the Related Art

Heating and cooling to achieve comfort and to manage the temperature of critical systems and equipment is primarily accomplished through centralized systems. In these systems, hot and cold working fluids are used to provide temperature control for target objects within comparatively large volumes and surrounding structures. The system's capacity must be sized to heat or cool the target objects plus the thermal loads of the surrounding structures, extraneous objects and barrier materials. Heating and cooling of objects other than the targets results in significant energy waste, and slower response time for the system.

Variations of this system configuration involve conveying the working fluids conditioned in the central system to separate areas by means of specific ducts. This approach also suffers from the energy losses described above.

In buildings, centralized heating and cooling systems are used to establish and maintain occupant comfort, and in special cases, the temperature control of sensitive electronic equipment. These systems create and distribute heated and cooled air from a central point. The system is subject to significant losses as only a fraction of the thermal power developed by the central system reaches the target objects as the majority of the thermal capacity is wasted conditioning walls, ducting, ceilings, windows and furniture. Centralized heating and cooling systems with rotating mechanical parts tend to be noisy, and are subject to seal and other mechanical failures. The systems use ozone depleting refrigerants such as R-134A. With the exception of heat pump systems which operate over a narrow temperature range, a separate unit is required for heating.

Building heating and cooling is also provided by smaller, localized units, however such units utilize compressors for cooling which are noisy, vibrate, and utilize mechanical parts subject to failure, use ozone depleting refrigerants, and an additional unit is required for heating. The use of thermoelectric devices for these applications has been limited as they suffer from poor efficiency and use too much thermoelectric material to provide the needed capacity within cost constraints.

In automobiles, air is forced across an evaporator core within a centralized air handler unit to provide cool air to the passenger cabin in hot conditions. The cold air created in the air handler unit is distributed through a series of valves and air ducts to cool passengers. Such a system may supply 3,000 to 4,500 watts of cooled air at a steady state condition, of which the passengers require (and receive) only a small fraction. The majority of the cooled air is spent lowering the temperature of other parts of the cabin including the windows, head liner, seats and flooring. In addition, the cooling devices of such systems use chemicals such as R-134A with a high Green House Gas Index and operate with moving mechanical parts subject to failure.

In heating mode, the air handler unit provides heating through the same distribution system and suffers losses similar to those experienced by A/C systems as the majority of the warmed air is spent heating various elements of the cabin other than the occupants. Also, since waste heat from the engine coolant is used to heat occupants, the response time is slow. This is especially true for small-engine efficient vehicles such as diesels and hybrids. This condition has been recognized and Positive Temperature Coefficient (PTC) heaters are used to supplement engine coolant heating. However, such devices are inefficient.

The Climate Controlled Seat System (CCS™) described by Feher (U.S. Pat. No. 4,923,248, issued May 8, 1990, "Cooling and Heating Seat Pad Construction"), provides a thermoelectric system for distributed heating and cooling by embedding heating and cooling devices within an occupant's seat back and cushion, however it only partially addresses the need for occupant comfort because the human body requires heating and cooling of surfaces not touching the seat and backrest. In addition, the thermal capacity of the device is limited by the use of air as the sole working fluid due to its low heat capacity.

SUMMARY

In certain embodiments, a thermoelectric system provides distributed localized heating, cooling, or both heating and cooling. The thermoelectric system comprises at least one fluid conduit configured to allow a first working fluid to flow therein. The thermoelectric system further comprises a plurality of thermoelectric assemblies. Each thermoelectric assembly comprises a plurality of thermoelectric elements, and each thermoelectric assembly is in thermal communication with the first working fluid and in thermal communication with a region corresponding to the thermoelectric assembly. Each thermoelectric assembly is selectively operable either to heat the region corresponding to the thermoelectric assembly by transferring heat from the first working fluid to the region corresponding to the thermoelectric assembly or to cool the region corresponding to the thermoelectric assembly by transferring heat from the region corresponding to the thermoelectric assembly to the first working fluid. Each thermoelectric assembly is operable independently from operation of other thermoelectric assemblies of the plurality of thermoelectric assemblies.

In certain embodiments, at least a portion of the first working fluid flows through the at least one fluid conduit such that the at least a portion of the first working fluid is sequentially in thermal communication with two or more thermoelectric assemblies of the plurality of thermoelectric assemblies. The at least a portion of the first working fluid can be heated by at least one of the thermoelectric assemblies and cooled by at least one of the thermoelectric assemblies. The first working fluid of certain embodiments flows repeatedly through the at least one fluid conduit. In certain embodiments, at least a portion of the first working fluid flows through the at least one fluid conduit such that the at least a portion of the first working fluid is not in thermal communication with two or more thermoelectric assemblies of the plurality of thermoelectric assemblies.

In certain embodiments, each thermoelectric assembly comprises a first side in thermal communication with the first working fluid and a second side in thermal communication with a second working fluid, and is configured to transfer heat between the first side and the second side. In certain embodiments the second working fluid is the same as the first working fluid, while in certain other embodiments, the second working fluid is different from the first working fluid. For example, the first working fluid can be water and the second working fluid can be air. In certain embodiments, at least one of the first working fluid and the second working fluid is a liquid (e.g., water). In certain embodiments, one of the first working fluid and the second working fluid is a liquid (e.g., water), and the other of the first working fluid and the second working fluid is a gas (e.g., air).

In certain embodiments, the thermoelectric system further comprises one or more valves which are adjustable to control flow of the first working fluid in the at least one fluid conduit. In certain such embodiments, the one or more valves are adjustable to place one or more selected thermoelectric assemblies in thermal communication with the first working fluid.

In certain embodiments, the thermoelectric system further comprises a thermal storage reservoir fluidically coupled to the at least one fluid conduit. The thermal storage reservoir is configured to receive the first working fluid. In certain embodiments, the thermal storage reservoir is also configured to store thermal power during peak generation events and to return thermal power to the first working fluid according to need. In certain embodiments, the thermoelectric system further comprises an intermediate heat exchanger in thermal communication with the first working fluid. The intermediate heat exchanger can be in thermal communication with a target object to be cooled or heated.

In certain embodiments, each thermoelectric assembly comprises a first heat exchanger in thermal communication with the first working fluid and a second heat exchanger in thermal communication with a second working fluid. In certain such embodiments, each second heat exchanger cools or heats the second working fluid to cool or heat the region corresponding to the thermoelectric assembly. In certain embodiments, the second working fluid flows from the region corresponding to the thermoelectric assembly to a volume to be cooled or heated. In certain embodiments, the second working fluid comprises a gas and the thermoelectric system further comprises one or more fans which drive the second working fluid from the region corresponding to the thermoelectric assembly to the volume.

In certain embodiments, the first heat exchanger comprises a plurality of fins. In certain embodiments, the second heat exchanger comprises a plurality of fins. In certain embodiments, each thermoelectric assembly comprises a plurality of N-type thermoelectric elements and a plurality of P-type thermoelectric elements, and each thermoelectric assembly further comprises a plurality of electrically conductive and thermally conductive connectors. Each of the connectors is in electrical communication and thermal communication with at least one of the plurality of N-type thermoelectric elements and with at least one of the plurality of P-type thermoelectric elements and in thermal communication with the first heat exchanger or the second heat exchanger. In certain such embodiments, each connector has a first portion and a second portion. The first portion is in thermal communication with the first heat exchanger or the second heat exchanger. The second portion is sandwiched between at least one of the plurality of N-type thermoelectric elements and at least one of the plurality of P-type thermoelectric elements.

In certain embodiments, a network of distributed thermoelectric assemblies is provided. The network comprises a plurality of thermoelectric assemblies. Each thermoelectric assembly has a first side and a second side. Each thermoelectric assembly is selectively operable either to heat a region corresponding to the thermoelectric assembly by transferring heat from a first working fluid to the region corresponding to the thermoelectric assembly or to cool the region corresponding to the thermoelectric assembly by transferring heat from the region corresponding to the thermoelectric assembly to the first working fluid. Each thermoelectric assembly is operable independently from operation of other thermoelectric assemblies of the plurality of thermoelectric assemblies. Each thermoelectric assembly comprises a plurality of thermoelectric elements in thermal communication with the first side and with the second side of the thermoelectric assembly. Each thermoelectric assembly further comprises a first heat exchanger in thermal communication with the first side of the thermoelectric assembly. The first heat exchanger is configured to be in thermal communication with the first working fluid. Each thermoelectric assembly further comprises a second heat exchanger in thermal communication with the second side of the thermoelectric assembly and with the region corresponding to the thermoelectric assembly. The network further comprises one or more conduits fluidically coupled to the first heat exchangers of each thermoelectric assembly of the plurality of thermoelectric assemblies. The one or more conduits provide a flowpath through which the first working fluid flows to and from each of the first heat exchangers.

In certain embodiments, the first working fluid comprises water and can flow sequentially through the plurality of thermoelectric assemblies. The first working fluid of certain embodiments flows in parallel through at least some thermoelectric assemblies of the plurality of thermoelectric assemblies.

In certain embodiments, the second heat exchanger is configured to be in thermal communication with a second working fluid, which can comprise air. In certain embodiments, the second working fluid provides localized heating or cooling (e.g., conditioned air) to a volume. In certain embodiments, the volume comprises a passenger compartment of a vehicle or a portion of a building.

In certain embodiments, the network further comprises a central processing unit. Flow of the first working fluid through the one or more conduits to each first heat exchanger is adjustable in certain embodiments by at least one valve responsive to signals from the central processing unit. In certain embodiments, the network further comprises at least one sensor in electrical communication with the central processing unit. The central processing unit is configured to receive at least one signal from the at least one sensor. The at least one signal of certain embodiments is indicative of at least one condition within a volume to be locally heated or cooled. The at least one condition can be selected from the group consisting of: ambient temperature, local surface temperature, radiant loads, humidity, occupant number, occupant weight, occupant clothing thickness, and occupant location.

In certain embodiments, the network further comprises a thermal storage reservoir fluidically coupled to the one or more conduits. In certain such embodiments, the thermal storage reservoir is configured to store thermal power during peak generation events and to return thermal power to the first working fluid according to need. In certain embodiments, the network further comprises an intermediate heat exchanger fluidically coupled to the one or more conduits. In certain such embodiments, the intermediate heat exchanger is in thermal communication with a target object to be cooled or heated.

In certain embodiments, a network of distributed thermoelectric assemblies is provided for heating, cooling, or both heating and cooling localized portions of a passenger compartment of a vehicle. The network comprises a plurality of thermoelectric assemblies. Each thermoelectric assembly has a first side and a second side. Each thermoelectric assembly is selectively operable either to heat a region corresponding to the thermoelectric assembly by transferring heat from a first working fluid to the region corresponding to the thermoelectric assembly or to cool the region corresponding to the thermoelectric assembly by transferring heat from the region corresponding to the thermoelectric assembly to the first working fluid. Each thermoelectric assembly is operable independently from operation of other thermoelectric assemblies of the plurality of thermoelectric assemblies. Each thermoelectric assembly comprises a plurality of thermoelectric elements in thermal communication with the first side and with the second side of the thermoelectric assembly. Each thermoelectric assembly further comprises a first heat exchanger in thermal communication with the first side of the thermoelectric assembly. The first heat exchanger is configured to be in thermal communication with the first working fluid. Each thermoelectric assembly further comprises a second heat exchanger in thermal communication with the second side of the thermoelectric assembly. The second heat exchanger is configured to be in thermal communication with a second working fluid. The network further comprises one or more conduits fluidically coupled to the first heat exchangers of each thermoelectric assembly of the plurality of thermoelectric assemblies. The one or more conduits provide a flowpath through which the first working fluid flows to and from each of the first heat exchangers.

In certain embodiments, the first working fluid has a first thermal capacity and the second working fluid has a second thermal capacity less than the first thermal capacity. For example, the first working fluid can comprise a liquid (e.g., a 50/50 mixture of ethylene glycol and water) and the second working fluid can comprise a gas (e.g., air). In certain embodiments, each first heat exchanger comprises extruded aluminum tubes and each second heat exchanger comprises aluminum fins brazed between aluminum face sheets.

In certain embodiments, the one or more conduits are selectively fluidically coupled by one or more valves to an engine coolant loop or an auxiliary cooling radiator of the vehicle. In certain embodiments, the one or more conduits are fluidically coupled by one or more valves to a heat exchanger in thermal communication with a vehicle battery or a vehicle fuel tank.

In certain embodiments, air from at least one of the second heat exchangers is outputted into the passenger compartment from at least one location selected from the group consisting of: the headliner, one or more pillars, one or more seat cushions, one or more seat backs, and the steering column. In certain embodiments, at least one of the second heat exchangers is configured to provide temperature control for electronic equipment of the vehicle, a vehicle battery, or an inner volume of a storage container of the vehicle.

In certain embodiments, the network further comprises at least one waste heat exchanger in thermal communication with the first working fluid and configured to direct heat from the first working fluid to a thermal mass outside the passenger compartment. The thermal mass of certain embodiments is selected from the group consisting of: a frame portion, a fuel tank, a battery, and a phase change thermal capacitor. In certain embodiments, the network is configured to be operable for a period of time during which a source of electrical power for the vehicle (e.g., an engine, a battery, a capacitor, a fuel cell, a solar cell, or a flywheel) is off. In certain embodiments, the source of electrical power is the primary source of electrical power for the vehicle.

In certain embodiments, a method for heating, cooling, or both heating and cooling localized portions of a vehicle is provided. The method comprises providing a thermoelectric system comprising at least one fluid conduit configured to allow a first working fluid to flow therein and a plurality of thermoelectric assemblies. Each thermoelectric assembly comprises a plurality of thermoelectric elements. Each thermoelectric assembly is in thermal communication with the first working fluid and in thermal communication with a region of the vehicle corresponding to the thermoelectric assembly. Each thermoelectric assembly is selectively operable either to heat the region corresponding to the thermoelectric assembly by transferring heat from the first working fluid to the region corresponding to the thermoelectric assembly or to cool the region corresponding to the thermoelectric assembly by transferring heat from the region corresponding to the thermoelectric assembly to the first working fluid. Each thermoelectric assembly is operable independently from operation of other thermoelectric assemblies of the plurality of thermoelectric assemblies. The method further comprises preconditioning at least one region of the vehicle by operating at least one thermoelectric assembly of the thermoelectric system.

In certain embodiments, preconditioning the at least one region comprises cooling or heating at least a portion of a passenger compartment of the vehicle prior to an occupant entering the passenger compartment of the vehicle. In certain embodiments, preconditioning the at least one region comprises cooling at least a portion of a passenger compartment of the vehicle below a condensation temperature so as to remove water vapor from the passenger compartment. In certain embodiments, preconditioning the at least one region comprises placing a battery of the vehicle at an optimum temperature. In certain embodiments, preconditioning the at least one region comprises placing a catalytic converter of the vehicle at an optimum temperature.

BRIEF DESCRIPTION OF THE DRAWINGS

FIGS. 2A and 2B schematically illustrate two example thermoelectric (TE) assemblies in accordance with certain embodiments described herein.

FIGS. 7A and 7B schematically illustrate two views of an example TE assembly for automotive ventilating, heating, and cooling.

FIG. 8 schematically illustrates a radiator which receives the liquid working fluid used in one or more TE assemblies.

FIG. 9 schematically illustrates an auxiliary cooling radiator which receives the liquid working fluid used in one or more TE assemblies.

DETAILED DESCRIPTION

A distributed system described by Elliot et al. (U.S. Patent Application Publication No. US2007/0000255, published Jan. 4, 2007, "Autonomous Air-Conditioning Module Intended Particularly for the Thermal Treatment of an Area of a Vehicle Cabin") heats and cools automobile passenger cabin air by circulating the air through localized and autonomously controlled thermoelectric devices. The modules have air intake and exhaust features to force the air through the Peltier devices. The system, however, is limited in capacity as the result of several factors.

Firstly, the thermoelectric module described by Elliot operates by recirculating cabin air through a thermoelectric device. The thermal capacity of such a device is significantly limited according to the relatively low heat capacity of the working fluids used compared certain embodiments described herein.

Secondly, the thermoelectric device described by Elliot is inefficient compared to certain embodiments described herein and its operation is limited to about 12% of the Carnot efficiency with TE materials with a ZT of 1.

Thirdly, the device described by Elliot is bulky compared to certain embodiments described herein, using much more thermoelectric material (limiting capacity) and increasing the cost of the device.

Fourthly, the advantages of connecting such devices in a network where the devices share a common primary working fluid to gain system and device efficiency and capacity advantages is not anticipated or depicted in prior art.

Certain embodiments described herein provide a thermoelectric system and method that provides a significantly higher device and system efficiency and larger thermal capacity for distributed and localized heating and cooling than those described in the prior art.

Certain embodiments described herein provide a ventilating, heating and cooling system that overcomes the drawbacks and has significantly greater efficiency than that of prior art. More specifically, certain embodiments described herein aim to provide a high capacity of distributed and localized heating and cooling in an efficient manner.

Figure 1:
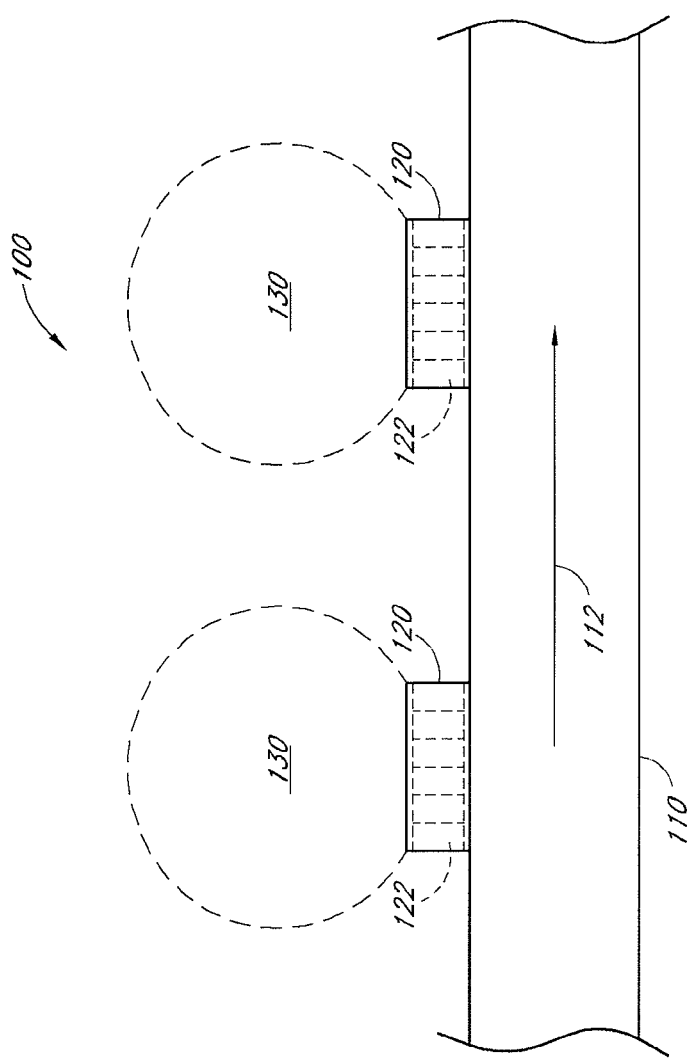
FIG. 1 schematically illustrates an example thermoelectric system in accordance with certain embodiments described herein.

FIG. 1 schematically illustrates an example thermoelectric system 100 in accordance with certain embodiments described herein. The thermoelectric system 100 comprises at least one fluid conduit 110 configured to allow a first working fluid 112 to flow therein (schematically illustrated in FIG. 1 by the arrow). The thermoelectric system 100 further comprises a plurality of thermoelectric (TE) assemblies 120. Each TE assembly 120 comprises a plurality of TE elements 122, and each TE assembly 120 is in thermal communication with the first working fluid 112 and in thermal communication with a region 130 corresponding to the TE assembly 120. Each TE assembly 120 is selectively operable either to heat the region 130 corresponding to the TE assembly 120 by transferring heat from the first working fluid 112 to the region 130 corresponding to the TE assembly 120 or to cool the region 130 corresponding to the TE assembly 120 by transferring heat from the region 130 corresponding to the TE assembly 120 to the first working fluid 112. Each TE assembly 120 is operable independently from operation of other TE assemblies of the plurality of TE assemblies.

As used herein, the phrase "each TE assembly" has a broad meaning, including, but not limited to, referring to an individual TE assembly of the plurality of TE assemblies. The thermoelectric system 100 of certain embodiments may comprise one or more other TE assemblies, besides those of the plurality of TE assemblies 120, which do not have one or more of the attributes described herein for the TE assemblies 120 which comprise the plurality of TE assemblies 120. In particular, the phrase "each TE assembly" is not to be interpreted to mean that every TE assembly of the thermoelectric system 100 conforms to the description herein.

As used herein, the phrase "region corresponding to a TE assembly" has a broad meaning including, but not limited to, a region in proximity to a TE assembly, a region in thermal communication with a TE assembly, or a region which is cooled or heated by operation of a TE assembly. Such regions do not have a specific size, shape, orientation, or position relative to the TE assemblies to which they correspond, but one or more properties of such a region (e.g., temperature, humidity) are affected at least by operation of the TE assembly to which the region corresponds. While the regions 130 of FIG. 1 are schematically shown by the dashed lines to be non-overlapping, in certain embodiments, the regions 130 can be overlapping or non-overlapping. Furthermore, while the regions 130 of FIG. 1 are schematically shown by the dashed lines to have generally similar sizes to one another, in certain other embodiments, the regions 130 can be of different sizes, shapes, orientations, or positions relative to the TE assemblies 120 to which they correspond. In certain embodiments, the regions 130 comprise objects or personnel to be cooled or heated.

In certain embodiments, the thermoelectric system 100 can comprise a network of distributed TE assemblies which is configured to provide distributed localized climate control (e.g., control of temperature, humidity, or both by heating, cooling, or both) to a volume in which people, animals, or climate-sensitive equipment may reside. For example, in certain embodiments, the thermoelectric system 100 is configured to provide conditioned air to a passenger compartment of a vehicle (e.g., car, truck, bus, train, airplane, ship), to an occupied portion of a building, or to provide climate control (e.g., control of temperature, humidity, or both by heating, cooling, or both) to electronic equipment.

In certain embodiments, the first working fluid 112 is a liquid (e.g., water), while in certain other embodiments, the first working fluid 112 is a gas (e.g., air). In certain embodiments, as schematically illustrated by FIG. 1, the at least one fluid conduit 110 comprises a pipe, tube, vent, duct, or other type of elongate passage which substantially encloses a region through which the first working fluid 112 flows. In certain other embodiments, the at least one fluid conduit 110 comprises a region through which the first working fluid 112 flows which is not substantially enclosed. In certain embodiments, the at least one fluid conduit 110 is part of a first working fluid loop 113 through which the first working fluid 112 flows repeatedly. In certain such embodiments, the first working fluid 112 can be pumped through the loop 113 to flow from a first end of the at least one fluid conduit 110, through the at least one fluid conduit 110, to a second end of the at least one fluid conduit 110, and to return to the first end of the at least one fluid conduit 110. In certain embodiments, the at least one fluid conduit 110 comprises one or more valves to control the flow of the first working fluid 112 through the at least one fluid conduit 110.

In certain embodiments, the plurality of TE assemblies 120 comprise one or more improved, high efficiency TE assemblies utilizing thermal isolation and/or high density design and construction (see, e.g., U.S. Pat. No. 6,539,725, issued to Bell on Apr. 1, 2003, "High Efficiency Thermoelectrics Utilizing Thermal Isolation," and U.S. Pat. No. 6,625,990, issued to Bell on Sep. 30, 2003, "Thermoelectric Power Generation Systems," each of which is incorporated in its entirety by reference herein). Other types of TE assemblies 120 are also compatible with various embodiments described herein. The TE assemblies 120 can be arranged in a series and/or parallel network with one another in which the TE assemblies 120 are connected (e.g., by electric power, device and system level control, sensory feedback, or working fluid flow).

Each TE assembly 120 of the plurality of TE assemblies 120 comprises a plurality of TE elements 122. In certain embodiments, the plurality of TE elements 122 comprises a plurality of N-type TE elements 122a and a plurality of P-type TE elements 122b. Each TE assembly 120 of certain embodiments further comprises a plurality of electrically conductive and thermally conductive connectors 123. In certain embodiments, each connector 123 is in electrical communication and in thermal communication with at least one of the plurality of N-type TE elements 122a and with at least one of the plurality of P-type TE elements 122b.

In certain embodiments, each TE assembly 120 has a first side and a second side, and the TE assembly 120 is configured to transfer heat between the first side and the second side. FIGS. 2A and 2B schematically illustrate two example TE assemblies 120 in accordance with certain embodiments described herein. In FIG. 2A, the plurality of TE elements 122 and the connectors 123 are configured such that electric current flows generally in multiple directions (e.g., a generally serpentine pattern) from a connector 123, through an N-type TE element 122a, through a connector 123, and through a P-type TE element 122b. In FIG. 2B, the plurality of TE elements 122 and the connectors 123 are configured such that electric current flows generally in one direction (e.g., linearly) from a connector 123, through an N-type TE element 122a, through a connector 123, and through a P-type TE element 122b. Other configurations of the plurality of TE elements 122 and connectors 123 are also compatible with certain embodiments described herein.

In certain embodiments, each TE assembly 120 comprises a first heat exchanger 124 in thermal communication with a first set of the connectors 123 and a second heat exchanger 125 in thermal communication with a second set of the connectors 123. In certain embodiments, upon operation of the TE assembly 120, the first heat exchanger 124 is either cooled or heated by the first set of the connectors 123 and the second heat exchanger 125 is either heated or cooled by the second set of the connectors 123.

Figure 3A:
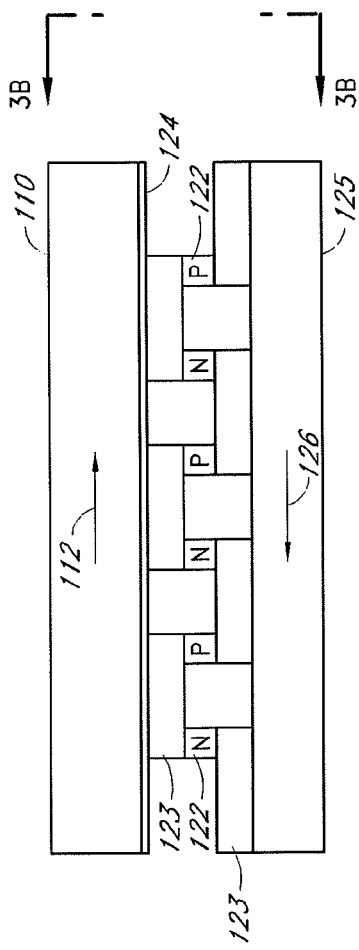
FIGS. 3A and 3B schematically illustrate two views of an example TE assembly in accordance with certain embodiments described herein.
Figure 3B:
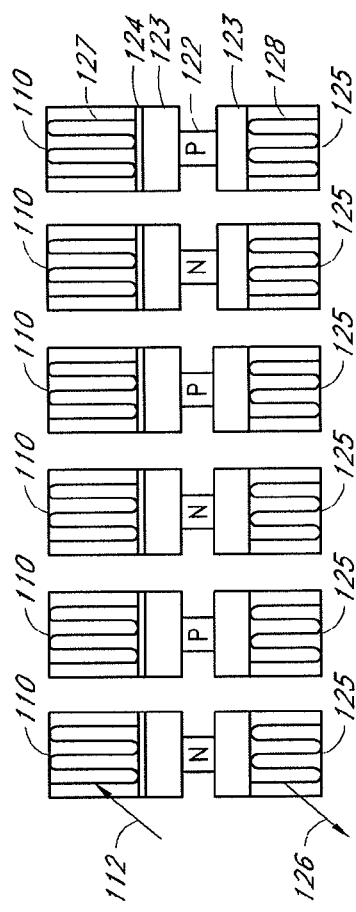
Figure 4B:
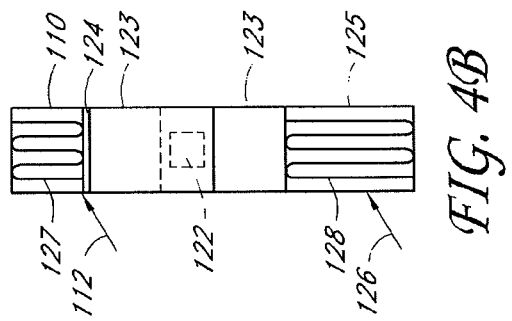
FIGS. 4A and 4B schematically illustrate two views of another example TE assembly in accordance with certain embodiments described herein.
Figure 4A:
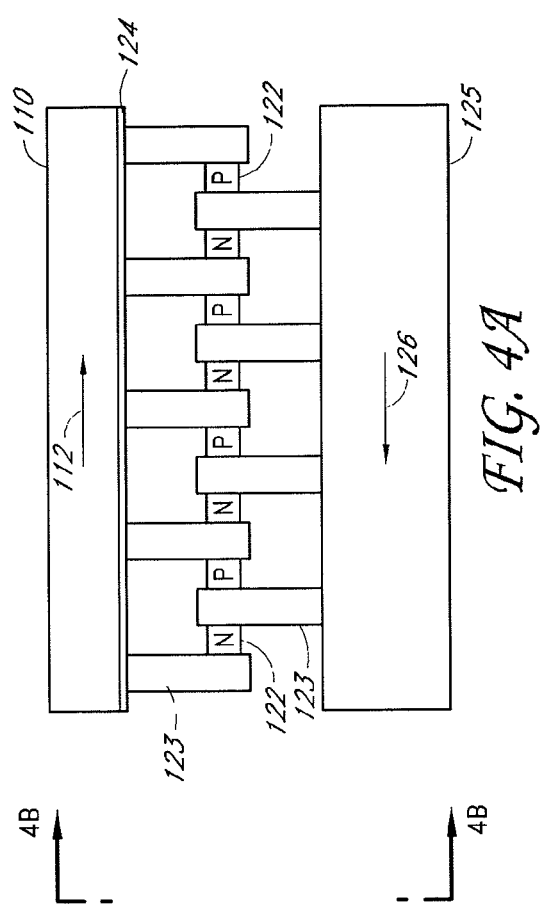

FIGS. 3A and 3B schematically illustrate two views of an example TE assembly 120 incorporating thermal isolation and high power density design and construction in accordance with certain embodiments described herein. In the TE assembly 120 of FIGS. 3A and 3B, each connector 123 of the first set of the connectors 123 is sandwiched between the first heat exchanger 124 and a pair of TE elements 122 (e.g., an N-type TE element and a P-type TE element). In certain embodiments, each of the first heat exchangers 124 are thermally isolated from one another and each of the second heat exchangers 125 are thermally isolated from one another. FIGS. 4A and 4B schematically illustrate two view of another example TE assembly 120 in accordance with certain embodiments described herein. In the TE assembly 120 of FIGS. 4A and 4B, each connector 123 has a first portion in thermal communication with the first heat exchanger 124 or the second heat exchanger 125, and a second portion sandwiched between two TE elements 122 (e.g., between an N-type TE element and a P-type TE element).

In certain embodiments, the first heat exchanger 124 comprises a solid material and comprises a first side of the TE assembly 120 in thermal communication with the first working fluid 112. The first heat exchanger 124 of certain embodiments comprises the at least one fluid conduit 110. For example, the first heat exchanger 124 can comprise a portion (e.g., a wall) of a pipe or duct in thermal communication with the first set of the connectors 123 and through which the first working fluid 112 flows. In certain embodiments, the first heat exchanger 124 comprises a plurality of fins 127 across which the first working fluid 112 flows, for example as schematically illustrated by FIGS. 3B and 4B.

In certain embodiments, the second heat exchanger 125 comprises a solid material and comprises a second side of the TE assembly 120 in thermal communication with a second working fluid 126. In certain embodiments, the second heat exchanger 125 comprises a plurality of fins 128 across which the second working fluid 126 flows, for example as schematically illustrated by FIGS. 3B and 4B. The second heat exchanger 125 of certain embodiments cools or heats the second working fluid 126 to cool or heat the region 130 corresponding to the TE assembly 120, thereby distributing thermal power locally. For example, in certain embodiments, the second working fluid 126 can flow from the region 130 corresponding to the TE assembly 120 (e.g., a region 130 within the second heat exchanger 125) to a volume to be cooled or heated. Thus, in certain embodiments, the second working fluid 126 provides localized heating or cooling to the volume.

In certain embodiments, the second working fluid 126 is the same as the first working fluid 112, while in certain other embodiments, the second working fluid 126 is different (e.g., of a different material or phase) than the first working fluid 112. For example, in certain embodiments, at least one of the first working fluid 112 and the second working fluid 126 is a liquid. In certain embodiments, one of the first working fluid 112 and the second working fluid 126 is a liquid (e.g., water), and the other is a gas (e.g., air). In certain embodiments in which the second working fluid 126 comprises a gas, the thermoelectric system 100 further comprises one or more fans which drive the second working fluid 126 from the region 130 corresponding to the TE assembly 120 to the volume to be cooled or heated. In certain embodiments, the second working fluid 126 for the various TE assemblies 120 of the thermoelectric system 100 can be the same or different from one another. For example, for each TE assembly 120 in the thermoelectric system 100, the second working fluid 126 can be selected based upon characteristics of the target region 130 corresponding to the TE assembly 120. In cooling mode, the second working fluid 126 is cooled as it passes through the TE assembly 120 and in heating mode, the second working fluid 126 is heated as it passes through the TE assembly 120. In certain embodiments, the second working fluids 126 are used to extract or deliver thermal power to target regions 130 in the distributed system.

In certain embodiments, during operation of the thermoelectric system 100, thermal power is pumped between the first working fluid 112 flowing in the at least one fluid conduit 110 and the second working fluid 126 flowing in the second heat exchanger 125. In certain such embodiments, one purpose of the first working fluid 112 can be to provide a thermal source or sink for the distributed TE assemblies 120 that are in thermal communication with the first working fluid 112. In certain embodiments, the purpose of the second working fluid 126 (and of the second heat exchanger 125) can be to deliver the thermal power, derived in parts from the first working fluid 112 and the TE elements 122 to the distributed and localized target regions 130 corresponding to the TE assemblies 120.

Figure 5:
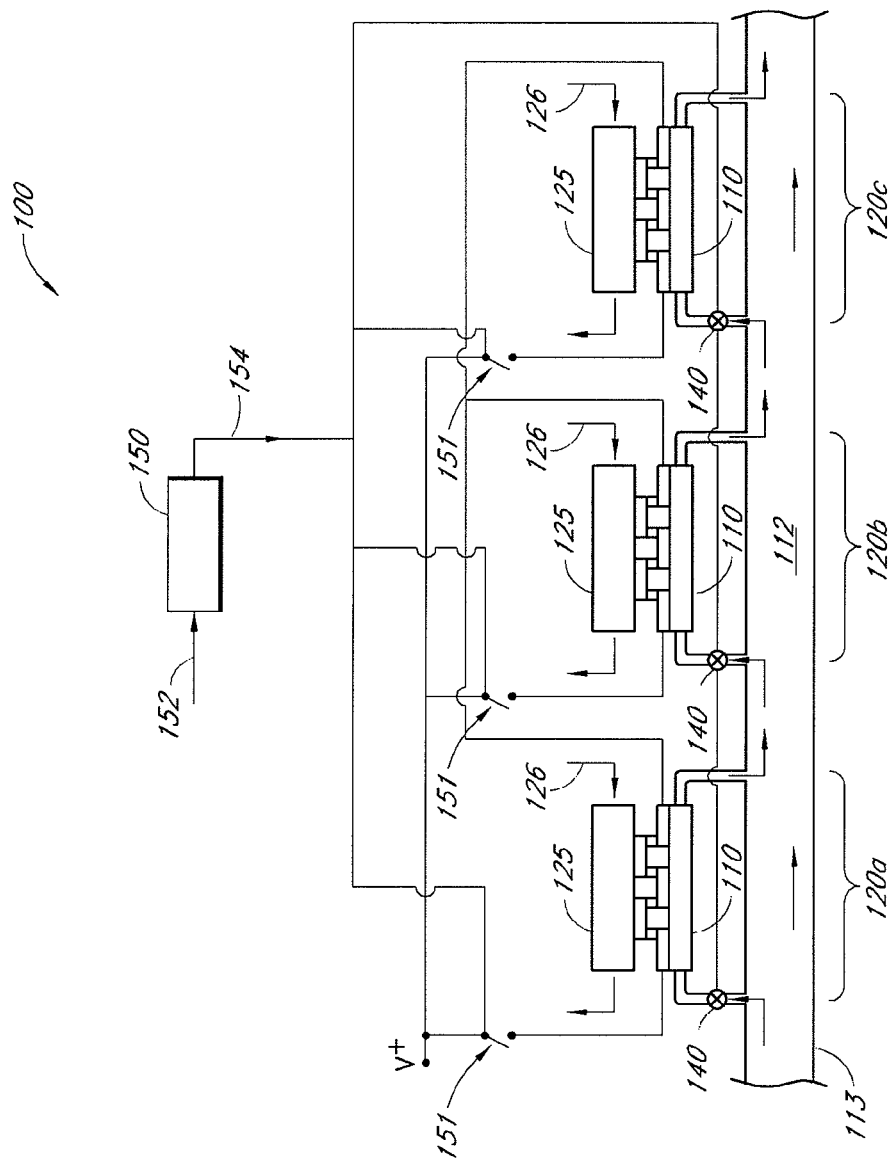
FIG. 5 schematically illustrates an example thermoelectric system comprising a network of distributed, thermally isolated TE assemblies in accordance with certain embodiments described herein.

FIG. 5 schematically illustrates an example thermoelectric system 100 comprising a network of distributed, thermally isolated TE assemblies 120 in accordance with certain embodiments described herein. As is depicted in FIG. 5, advantageously the first working fluid 112 (e.g., water) is circulated at high flow rate though a succession of thermoelectric assemblies 120a, 120b, 120c where the first working fluid 112 experiences slight changes in temperature. When a target region 130 is being heated by a TE assembly 120 to which the region 130 corresponds, the first working fluid 112 enters the TE assembly 120 with an entrance temperature and heat is extracted (pumped) from the first working fluid 112 so that the first working fluid 112 exits the TE assembly 120 with an exit temperature slightly cooler than the entrance temperature. When the target region 130 is being cooled by the TE assembly 120 to which the region 130 corresponds, the process is reversed and the first working fluid 112 exits the TE assembly 120 with an exit temperature slightly hotter than the entrance temperature. In both heating and cooling, the slight change in temperature of the first working fluid 112 only marginally affects thermoelectric device efficiency. The properties of the first working fluid 112 and its flow rate can be selected generally to optimize device and system level performance.

As schematically illustrated by FIG. 5, in certain embodiments, each TE assembly 120 comprises one or more flow controllers 140 (e.g., valves or pumps) which selectively fluidically couple the at least one fluid conduit 110 of the TE assembly 120 to the first working fluid 112 (e.g., in a reservoir or a conduit). In certain such embodiments, the one or more flow controllers 140 are adjustable to control flow of the first working fluid 112 in the at least one fluid conduit 110 of the TE assembly 120. As schematically illustrated by FIG. 5, the one or more flow controllers 140 are adjustable to place one or more selected TE assemblies 120 in thermal communication with the first working fluid 112. In certain embodiments, the one or more flow controllers 140 are placed on an inlet side, an outlet side, or both, of the at least one fluid conduit 110 of the TE assembly 120.

In certain embodiments, the thermoelectric system 100 further comprises a controller 150 (e.g., a central processing unit or microcontroller) and a plurality of switches 151 configured to selectively provide current flow to the TE elements 122 so as to adjust, turn on, or turn off the TE elements 122 of the TE assemblies 120. In certain embodiments, the thermoelectric system 100 further comprises at least one sensor in electrical communication with the controller 150. The controller 150 is configured to receive at least one signal 152 from the at least one sensor, the at least one signal indicative of at least one condition for the thermoelectric system 100 (e.g., sensor data indicative of the ambient temperature, local surface temperature, radiant loads, temperature or fluid flow of the first working fluid 112, temperature or fluid flow of the second working fluid 126, temperature, humidity, or other operating conditions of the regions 130, number of occupants of the regions 130, occupant weight, occupant clothing thickness, occupant location, and user commands). The controller 150 is configured to respond to the signals 152 by transmitting command signals 154 to the flow controllers 140 and to switches 151 so as to control the operation of the TE assemblies 120. In certain embodiments, flow of the first working fluid 112 through the one or more conduits fluidically coupled to the first heat exchangers 124 is adjustable by at least one valve responsive to signals from the controller 150. In certain embodiments in which the thermoelectric system 100 further comprises one or more fans to control the flow of the second working fluid 126 from the TE assemblies 120, the controller 150 is further configured to transmit command signals 154 to the fans as well.

In certain embodiments, the controller 150 advantageously provides local control of the comfort air delivered by the TE assemblies, thereby advantageously providing individual passenger comfort. A distributed thermoelectric system 100 comprising one or more TE assemblies 120 may be controlled by using sensors and algorithms designed to manage fluid flow rates and temperatures of the first working fluid 112 and/or the second working fluid 126.

Input signals to the controller 150 can comprise feedback and control information from the target regions and/or objects to be cooled or heated. Such information may include, but is not limited to, parameters such as temperatures of the regions (e.g., portions of the passenger cabin), occupants (e.g., measured using infrared sensors), objects (e.g., electronic equipment), engine, engine coolant, or working fluids, input power, vehicle electrical network power, occupant number, occupant weight, occupant size, occupant clothing thickness, occupant surface temperatures, occupant location (e.g., sensing proximity to cooling/heating vents), radiant loads, humidity levels, and any other useful parameter. Control feedback signals generated by the controller 150 can include, but are not limited to, target zone temperatures, target occupant skin temperatures, and target outside/inside average temperatures. Control signals generated by the controller 150 can include, but are not limited to, signals which are used to control the localized cooling or heating in various regions by controlling the pumps, fans, valves, or TE assemblies (e.g., heating mode, cooling mode).

In certain embodiments, temperature control modes (heating and cooling) may be changed by reversing input power polarity and may be selected locally by the user or centrally (e.g., by the controller 150) utilizing sensory input signals and control algorithms. In certain embodiments, a means for localized and autonomous control (e.g., a separate controller such as a microcontroller) may be provided for each TE assembly 120 in conjunction with sensors for indicating first and second working fluid temperatures for the purpose of temperature control and device safety. The control of a distributed system comprising several or many such TE assemblies 120 alternatively may be centralized by means of sensors and algorithms designed to manage first and second fluid flow rates and temperatures with feedback from the target regions 130.

In certain embodiments, at least a portion of the first working fluid 112 is sequentially in thermal communication with two or more TE assemblies 120. For example, the portion of the first working fluid 112 flows through the at least one fluid conduits 110 of two or more TE assemblies 120. In certain such embodiments, the portion of the first working fluid 112 is heated by at least one of the TE assemblies 120 and is cooled by at least one of the TE assemblies 120. In certain embodiments, the first working fluid 112 flows in parallel through at least some TE assemblies 120. In certain embodiments, at least a portion of the first working fluid 112 is not in thermal communication with two or more TE assemblies 120. For example, the portion of the first working fluid 112 flows through a single TE assembly 120, or flows through none of the TE assemblies 120.

Figure 6:
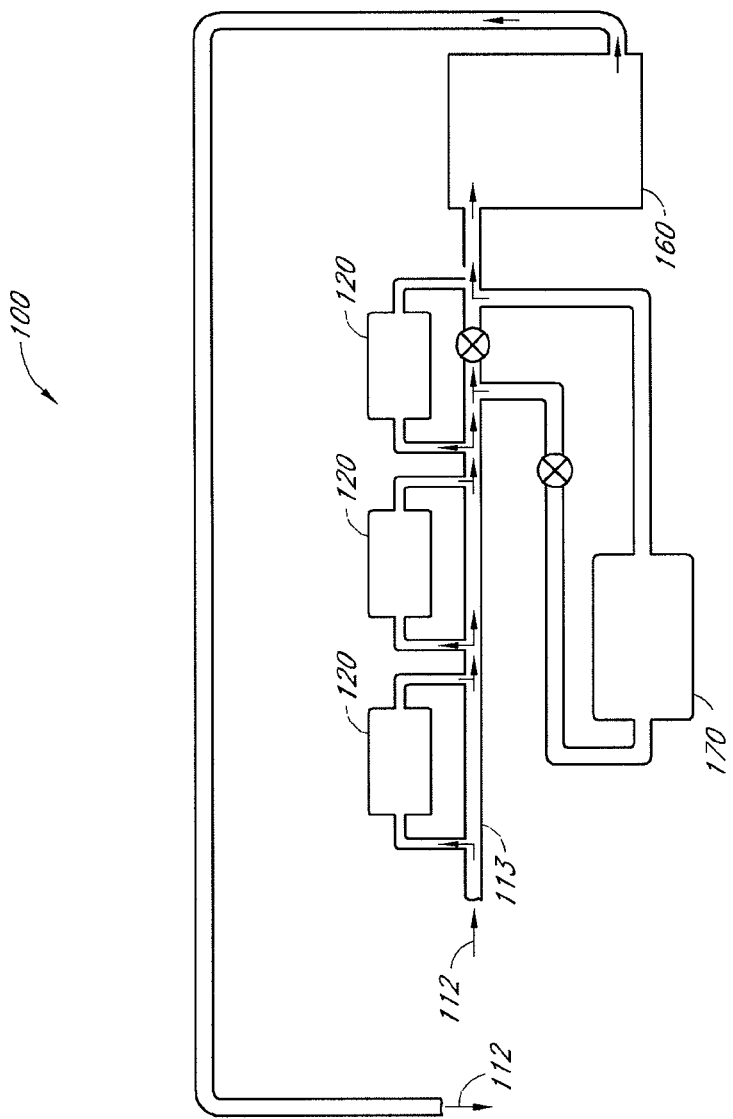
FIG. 6 schematically illustrates an example thermoelectric system further comprising a thermal storage reservoir and an intermediate heat exchanger in accordance with certain embodiments described herein.

FIG. 6 schematically illustrates an example thermoelectric system 100 further comprising a thermal storage reservoir 160 and an intermediate heat exchanger 170 in accordance with certain embodiments described herein. In certain embodiments, one or more thermal storage reservoirs 160 and/or intermediate heat exchangers 170 can be placed at intermediate locations within the thermoelectric network 100 in fluidic communication with the first working fluid loop 113. In certain such embodiments, the controller 150 of the thermoelectric system 100 receives sensor feedback signals from the thermal storage reservoir 160 and/or the intermediate heat exchanger 170 and provides system control signals to each TE assembly 120 in response to the sensor feedback signals.

In certain embodiments, the thermal storage reservoir 160 is fluidically coupled to the at least one fluid conduit 110 and is configured to receive the first working fluid 112. Thermal storage provided by the thermal storage reservoir 160 may be used advantageously in combination with the other portions of the thermoelectric system 100 to improve over-all system efficiency and capacity by storing thermal power during peak generation events and returning the first working fluid 112 to the thermoelectric system 100 according to need.

In certain embodiments, the intermediate heat exchanger 170 is in thermal communication with the first working fluid 112, and is in thermal communication with a target object to be cooled or heated. In certain such embodiments, the intermediate heat exchanger 170 advantageously provides opportunities to reject or absorb heat from the first working fluid 112 to heat sinks or heat sources isolated from the regions 130 corresponding to the TE assemblies 120.

In certain embodiments in which both heating and cooling are desired, the configuration of the first working fluid loop 113 and the flow of the second working fluid 126 through the TE assemblies 120 may be altered or combined to improve system efficiency. For example, as the first working fluid 112 is cooled as it passes through a succession of TE assemblies 120 operating in heating mode (e.g., providing warmed comfort air to a region 130), the first working fluid 112 may be directed to cool a target object (e.g., high electric power dissipation electronics) where the drop in temperature over several TE assemblies 120 operating in heating mode may accrete to the cooling performance of a separate target object in a different location. Alternatively, where a first working fluid 112 receives energy while the thermoelectric system 100 is operated to cool one or more target regions 130, the resulting heated first working fluid 112 may be used to provide heat which is transferred by a subsequent TE assembly 120 to heat a corresponding region 130. Networks of first working fluid loops 113 and second working fluid loops may be employed where the localized second working fluid loops provide first working fluid functionality to separate TE assemblies 120 operating in the same or different temperature modes.

The advantages of certain embodiments described herein over prior art systems include, but are not limited to:

1. Networking of thermally isolated and/or high power density TE assemblies 120 within a distributed heating/cooling thermoelectric system 100 can improve the efficiency, capacity and/or cost basis;

2. Using a first working fluid 112 that communicates with each TE assembly 120 advantageously that can provide a higher device and system efficiency and capacity; and 3. Networking and distribution of the first working fluid 112, electric power, device and system control, and sensor feedback can advantageously combine to provide higher system efficiencies and/or capacities at lower cost.

Automotive Example

FIGS. 7A and 7B schematically illustrate two views of an example TE assembly 220 used in a thermoelectric system 100 for automotive ventilating, heating, and cooling. In certain embodiments, the one or more TE assemblies 220 of the thermoelectric system 100 have a liquid heat exchanger 224 and an air heat exchanger 225 in thermal communication with a plurality of TE elements 222 via a plurality of connectors 223. In certain embodiments, at least one of the liquid heat exchanger 224 and the air heat exchanger 225 employs thermal isolation and/or high density design and construction (e.g., as described in U.S. Pat. Nos. 6,539,725 and 6,625,990 which are incorporated in their entireties by reference herein). Advantageously, in certain embodiments, the air heat exchanger 225 can be constructed using aluminum fins brazed between two aluminum face sheets and the liquid heat exchanger 224 can be manufactured from extruded aluminum tubes. Air 226 flows through the air heat exchanger 225 and the liquid working fluid 212 flowing through the liquid heat exchanger 224 in this example is a 50/50 mixture of ethylene glycol and water, while other liquids or gases may be used in other embodiments.

The TE assembly 220 operates in heating mode by pumping heat from the ethylene glycol/water working fluid 212 through the TE assembly 220 to the air 226. In cooling mode, thermal energy is pumped by the TE assembly 220 from the air 226 to the ethylene glycol/water working fluid 212. The thermal capacity of the liquid side of the TE assembly 220 is much greater than that of the air side, so that advantageously the liquid temperature changes very little and the resulting thermal power rejected can be transported away from the TE assembly 220 with minimal temperature rise. The efficiency of the TE assembly 220 can be approximately two times that of conventional devices due to the use of thermal isolation, and the amount of thermoelectric material used can be reduced typically by a factor of 6 to 25 by means of the high density design and construction of the TE assembly 220. The capacity of the TE assembly 220 to deliver heating or cooling power is approximately 2 to 6 times that of an air-to-air device because the liquid working fluid 212 offers a larger thermal source and/or sink than would be the case with air as the first working fluid.

In an example thermoelectric system 100 utilizing a plurality of TE assemblies 220 schematically depicted by FIGS. 7A and 7B, the ethylene glycol/water working fluid 212 flows in series through a number of fluidically coupled TE assemblies 220. Because the change in temperature of the liquid working fluid 212 can be small (on the order of one to two degrees Centigrade) across each TE assembly 220, the heating or cooling efficiency of each TE assembly 220 of the thermoelectric system 100 can be about the same.

In heating mode, the thermoelectric system 100 may utilize engine coolant as the liquid working fluid 212 to assist in rapidly boosting the temperature of the passenger compartment of the vehicle. For example, as schematically illustrated by FIG. 8, the liquid working fluid 212 flows through a radiator 230 configured to cool the engine 232 and flows through the network of TE assemblies 220. In certain embodiments, the liquid working fluid 212 is used to cool the powertrain of the vehicle. In cooling mode, the liquid working fluid 212 may be circulated through an auxiliary cooling radiator 240 to improve performance as schematically depicted in FIG. 9. Advantageously, for the example implementations of FIGS. 8 and 9, flow controllers 235 (e.g., valves) can be used to switch the liquid working fluid 212 between the engine coolant loop and the other fluid loops. In certain other embodiments, the liquid working fluid 212 may be routed to a heat exchanger attached to a vehicle battery (e.g., in an electric or hybrid vehicle) to warm the liquid working fluid 212 when passenger heating is desired. In certain other embodiments, the liquid working fluid 212 may be cooled by routing it through a heat exchanger attached or encased within the vehicle fuel tank.

Figure 10:
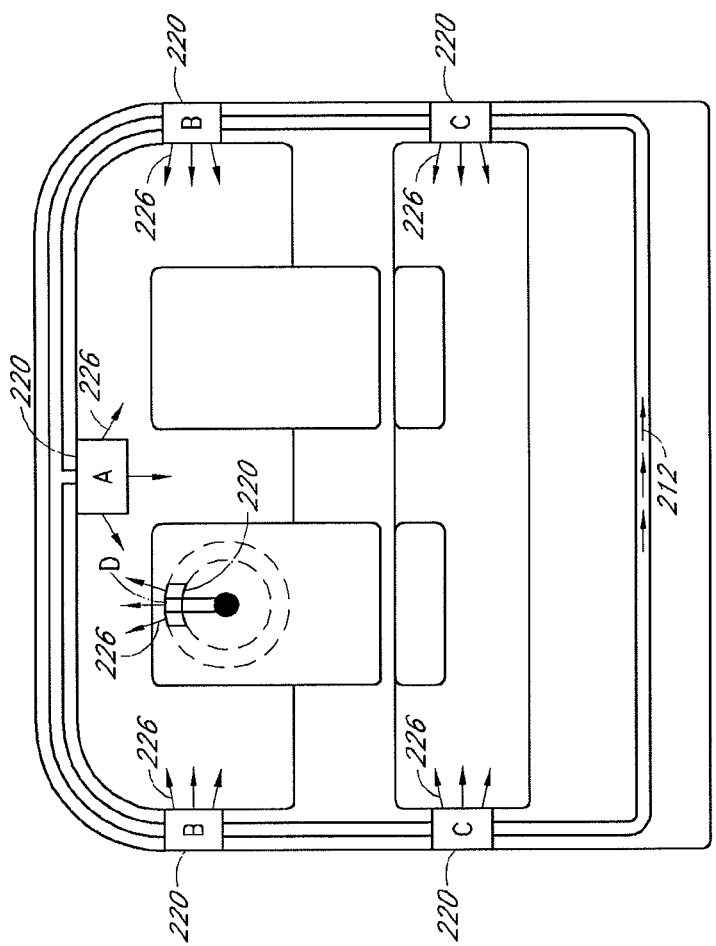
FIG. 10 schematically illustrates an example thermoelectric system in which the TE assemblies are scaled according to the required capacity of the thermoelectric system.

In certain embodiments, the TE assemblies 220 may be scaled and positioned in several ways to provide localized heating, cooling, or both heating and cooling of a passenger compartment 244 according to the required capacity of the thermoelectric system 100, as schematically illustrated by FIG. 10. For example, a large liquid-to-air TE assembly 220 may be arranged to deliver heating and cooling to occupants of the compartment 244 from the headliner of the vehicle (schematically illustrated in FIG. 10 by "A"), while smaller liquid-to-air TE assemblies 220 may be installed to deliver point heating or cooling to occupants in the compartment 244 at selected locations (e.g., one or more pillars denoted in FIG. 10 by "B" and "C," and steering wheel denoted by "D"). In such a network, the liquid working fluid 212 may communicate with each TE assembly 220 to deliver high thermal power.

Figure 11:
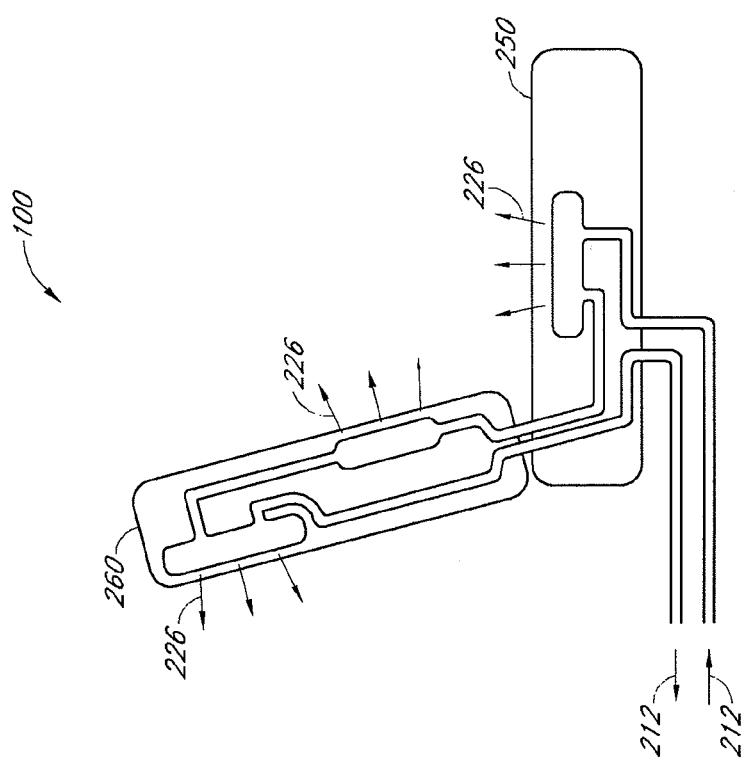
FIG. 11 schematically illustrates an example thermoelectric system in which the TE assemblies are located in the seat cushion and the seat back.

In addition, liquid-to-air TE assemblies 220 may be located in one or more seat cushions 250 and/or one or more seat backs 260 as schematically illustrated by FIG. 11. In certain such embodiments, the TE assemblies 220 are connected in series and/or in parallel with other TE assemblies 220 to deliver heating and/or cooling to occupants sitting in the seat or behind the seat. For example, the driver could be cooled and/or heated by a liquid-based CCS system in the front seat and the same liquid delivery system could connect to a separate TE assembly 220 with independent controls for cooling and/or heating the rear passenger behind the driver.

Figure 12:
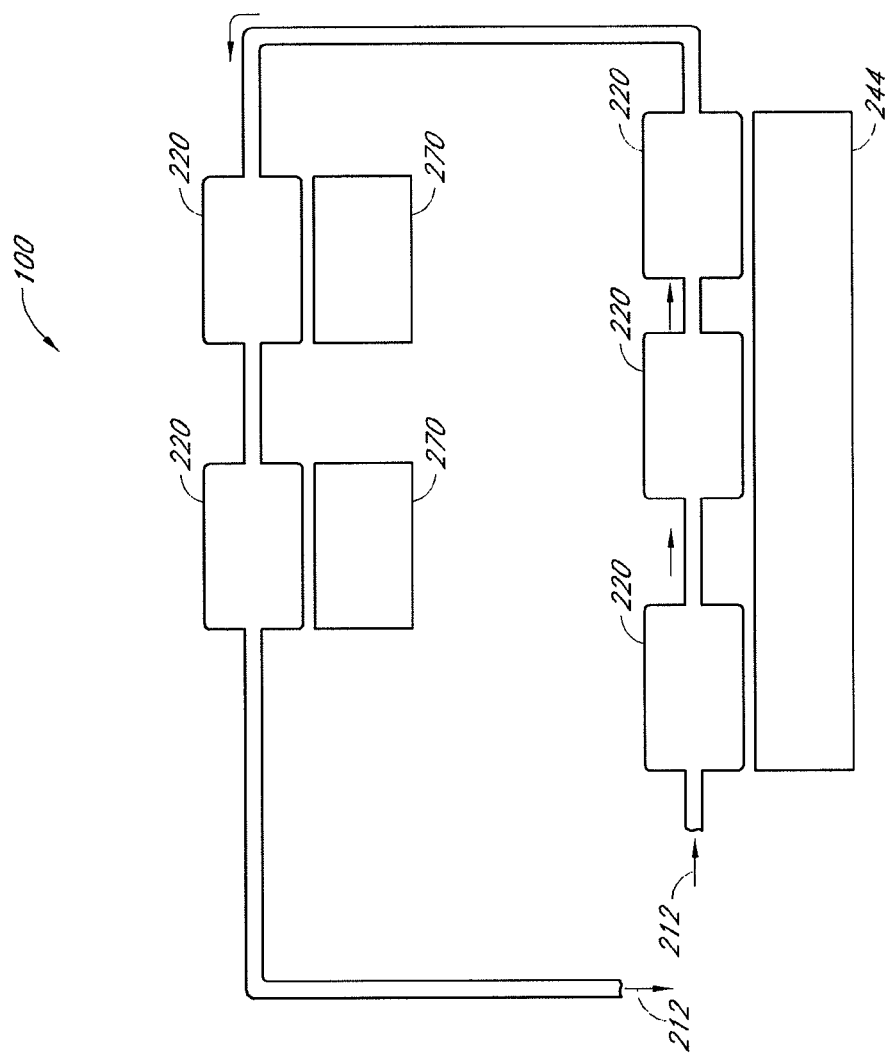
FIG. 12 schematically illustrates an example thermoelectric system in which one or more TE assemblies provide climate control of the passenger compartment and one or more TE assemblies provide temperature control of electronic equipment of the vehicle (e.g., such as batteries) in accordance with certain embodiments described herein.
Figure 13:
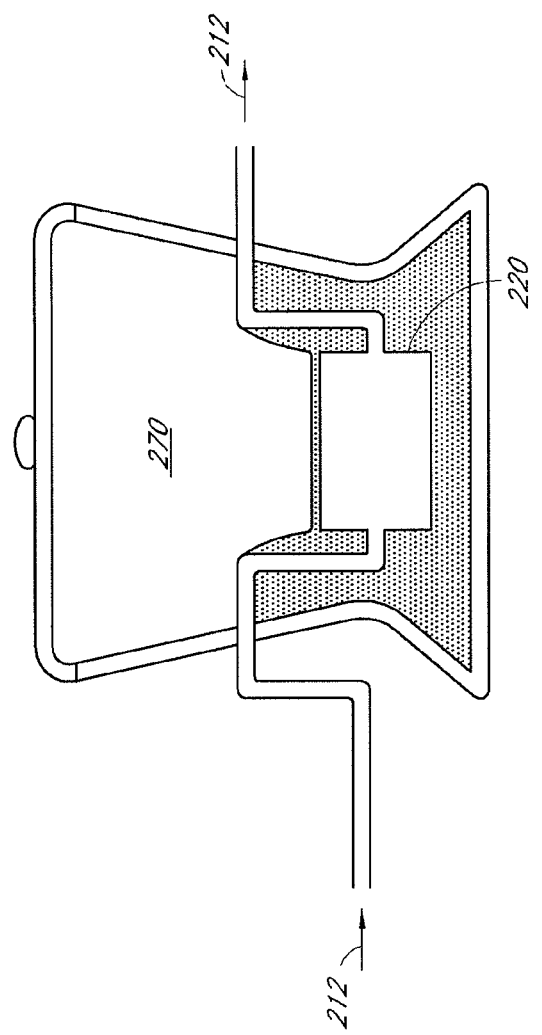
FIG. 13 schematically illustrates an example TE assembly being used to heat and/or cool a volume in which beverages or other items are stored.

FIG. 12 schematically illustrates an example thermoelectric system 100 in which one or more TE assemblies 220 provide climate control of the passenger compartment 244 and one or more TE assemblies 220 provide temperature control of electronic equipment 270 of the vehicle (e.g., thermally conditioning the battery by either cooling or heating the battery) in accordance with certain embodiments described herein. In certain embodiments, the TE assemblies 220 controlling the temperature of the electronic equipment 270 may use liquid as both the first working fluid 212 and the second working fluid 226. FIG. 13 schematically illustrates an example TE assembly 220 being used to heat and/or cool an inner volume 270 of a storage container in which food, beverages, or other items are stored.

In certain embodiments, advantageously, the liquid-to-air TE assemblies 220 and the liquid-to-liquid TE assemblies 220 incorporate thermal isolation and/or high density design and construction (e.g., as described in U.S. Pat. Nos. 6,539,725 and 6,625,990 which are incorporated in their entireties by reference herein). In certain such embodiments, the TE assemblies 220 can provide significantly higher thermal capacity than air-to-air devices. In addition, in certain embodiments, the TE assemblies may use less thermoelectric material, and may operate at higher efficiency and therefore may provide cost savings. In addition, the greater thermal capacity of a first working fluid loop using liquids can be greater than that of one using air resulting in certain embodiments described herein providing a larger thermal capacity for cooling and/or heating of target regions and/or objects.

Figure 14:
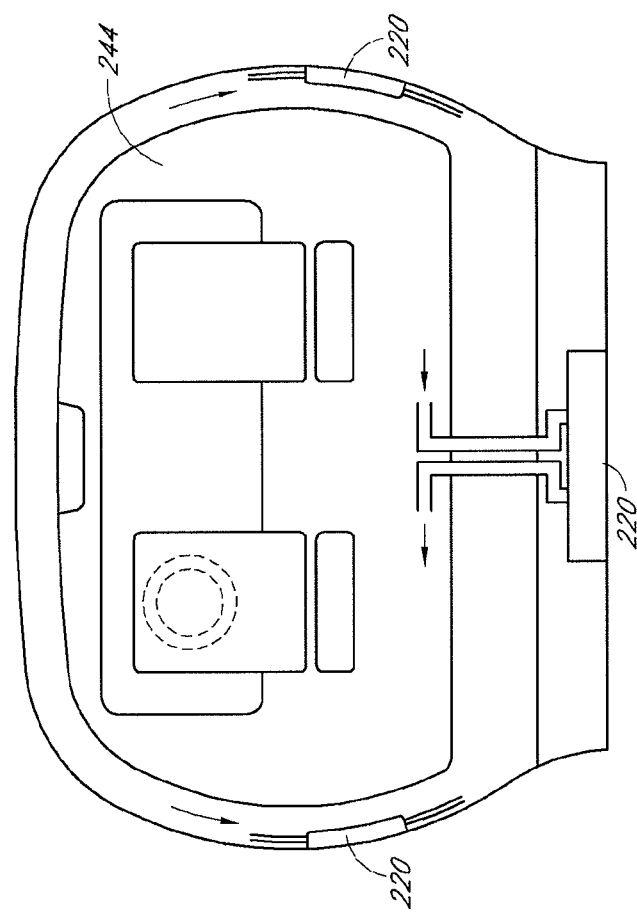
FIG. 14 schematically illustrates one or more heat exchangers connected with a portion of the liquid working fluid loop to transfer heat from the liquid working fluid to the outside of the passenger compartment.

In certain embodiments, the liquid working fluid loop connecting the TE assemblies 220 may have one or more waste heat exchangers which transfer waste thermal energy at various positions from the liquid working fluid loop to a thermal mass or regions outside the passenger compartment 244. For example, as schematically illustrated by FIG. 14, in certain embodiments, one or more heat exchangers may be connected with a portion of the ethylene glycol/water liquid working fluid loop (e.g., a liquid working fluid reservoir) to transfer heat from the liquid working fluid 212 to the outside of the passenger compartment 244. In this way, cooling capacity and over-all system efficiency may be greater. Thus, waste thermal power is transferred outside of the passenger compartment 244 in a manner that is difficult for the air-to-air system as described by Elliot et al. For example, the waste thermal power from the liquid working fluid 212 may be transferred to a large thermal mass (e.g., a portion of the vehicle frame, fuel tank, battery, phase change thermal capacitor, and/or any other advantageous components or systems). In certain embodiments, the large thermal mass can be a portion of the vehicle frame in the pillars, doors, body, chassis, or under the floor of the passenger compartment 244.

In certain embodiments, the thermoelectric system 100 can be operable in a vehicle or other application for a period of time with the primary source of electric power off (e.g., engine off operation) by using a source of auxiliary power (e.g., battery, capacitor, fuel cell, solar cell, flywheel, and/or any other source of power).

Because centralized heating and cooling systems require a significant amount of input energy and engine operation to provide comfort air and to condition sensitive systems, their use has been limited to periods when the vehicle engine is operating. It is desirable, however, to precondition certain areas and sensitive systems prior to vehicle operation such as at the start or the finish of the day. Preconditioning can significantly increase passenger comfort, increase the life expectancy of sensitive systems, and can be programmed or operated autonomously to reach desired operating conditions corresponding to anticipated needs using presently available devices such as cell phones or key fobs.

Figure 15:
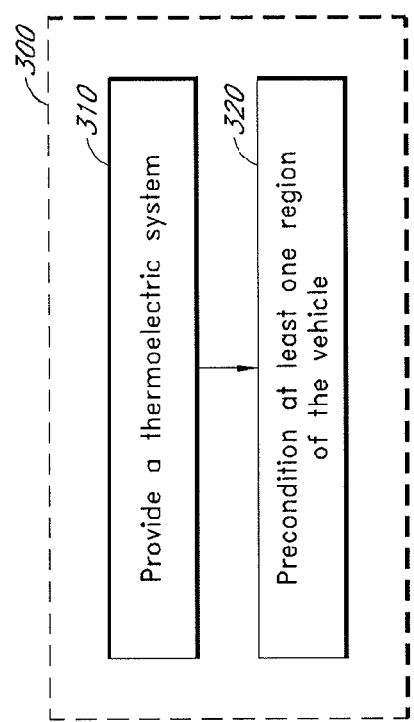
FIG. 15 is a flow diagram of a method for heating, cooling, or both heating and cooling localized portions of a vehicle in accordance with certain embodiments described herein.

FIG. 15 is a flow diagram of a method 300 for heating, cooling, or both heating and cooling localized portions of a vehicle in accordance with certain embodiments described herein. The method 300 comprises providing a thermoelectric system 100 in an operational block 310. Various examples of thermoelectric systems 100 are described herein which are compatible with certain embodiments. For example, in certain embodiments, the thermoelectric system 100 comprises at least one fluid conduit 110 configured to allow a first working fluid 112 to flow therein and a plurality of TE assemblies 120 in thermal communication with the first working fluid 112 and with a region 130 of the vehicle corresponding to the TE assembly 120.

The method 300 further comprises preconditioning at least one region 130 of the vehicle by operating at least one TE assembly 120 of the thermoelectric system 100 in an operational block 320. In certain embodiments, the thermoelectric system 100 is used to precondition selected regions or areas and/or sensitive systems or equipment prior to the engine being turned on. For example, prior to a person entering the vehicle, the thermoelectric system 100 is activated (e.g., using a cell phone or key fob) and is used to establish the desired temperature conditions (e.g., temperatures within the seat surfaces and throughout the steering wheel). The power source for the thermoelectric system 100 in certain such embodiments is the vehicle battery. In certain other embodiments, the power is provided from an external source via a power connection to the vehicle (e.g., a power cord plugged into an outlet in a building garage). In certain such embodiments, the passenger compartment of a vehicle can be pre-cooled down on a hot day, or preheated on a cold day, prior to occupant entry. In certain embodiments, the thermoelectric system 100 can be used to precondition at least a portion of a passenger compartment of the vehicle by cooling the portion below a condensation temperature so as to remove water vapor from the passenger compartment.

In addition, preconditioning can be performed for sensitive systems of the vehicle. Such sensitive systems may include, but are not limited to, a battery or a catalytic converter. In certain embodiments, preconditioning is used to place the sensitive system at an optimum temperature that maintains and extends the life of the sensitive system (e.g., optimizing the battery's temperature to maintain and extend the battery life). This is especially advantageous for highly electrified vehicles with large and expensive battery systems. Preconditioning can also be performed to establish desired temperatures of storage containers that hold food products or sensitive materials such as biologic specimens.

In certain embodiments, preconditioning is performed using preprogrammed or autonomous control (e.g., using a cell phone or key fob) to establish desired temperature conditions prior to periods of anticipated usage, such as at the start or end of the day. For example, much like the preset thermostatic control in buildings, a schedule for activating preconditioning may be set in advance and controlled by a central processing unit or microcomputer. Alternatively, the preconditioning may be activated by a remote control means when desired. In addition, the thermal storage systems of such a network may be preconditioned as well to deliver improved efficiency during vehicle operation.

Certain embodiments described herein provide an advantageous method for heating and/or cooling occupants and/or equipment, buildings, and any other use by focusing thermal power so as to not waste energy on non-target objects. Certain embodiments described herein advantageously conserve energy by using thermoelectric devices to generate and distribute thermally conditioned fluids at or in close proximity of target objects. In doing so, the inefficiencies associated with centralized systems due to losses occurring as a result of extraneous object cooling can be avoided at least in part.

A wide range of thermal management systems are enabled by certain embodiments described herein. For example, occupants of buildings may have comfort air provided in close proximity of their work surroundings without the need to thermally condition surrounding infrastructure. In addition, the occupants may autonomously control their local temperature environment by means of simple and direct controls.

Portions of the temperature-sensitive areas, such as high density computer boards, racks, or equipment, may be conditioned locally by employing certain embodiments described herein. Certain embodiments advantageously allow such areas to be managed in proportion to the need, as opposed to functioning of centralized systems that condition an entire room or building volume without regard to local need. Thus, over cooling non-operative or low dissipation equipment and under cooling or marginally cooling highly dissipative equipment can be avoided.

Passenger vehicles have begun to adopt localized thermal management to improve passenger comfort, however such systems rely on centralized A/C systems that are not as energy efficient as needed due to the excess capacity power to condition non-essential structural elements including floors, windows, head liners, etc. Thermoelectric systems have begun to be deployed to address these issues; however their design and construction causes their efficiency and cost to fall short of commercial acceptance.

Certain embodiments described herein address these shortcomings by combining thermoelectric materials advantageously using thermal isolation and/or high density designs and construction. In addition, by careful selection of the working fluids, these systems can provide significant efficiency, cost, and/or thermal capacity increases over the prior art.

Various embodiments have been described above. Although the invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A seat system for a passenger compartment of a vehicle, the seat system comprising:
   at least one fluid conduit loop configured to allow a liquid to flow in the at least one fluid conduit loop;
   one or more seat portions; and
   a plurality of thermoelectric assemblies located in the one or more seat portions,
   wherein at least two thermoelectric assemblies of the plurality of thermoelectric assemblies each have a first side and a second side and are configured to transfer thermal energy between the first side and the second side,
   wherein the at least two thermoelectric assemblies of the plurality of thermoelectric assemblies are in selective fluid communication with the liquid via a corresponding fluid flow controller of each of the at least two thermoelectric assemblies, the corresponding fluid flow controller configured to stop fluid flow of the liquid relative to the first side or to allow fluid flow of the liquid relative to the first side to place the first side in thermal communication with the liquid flowing through the at least one fluid conduit loop,
   wherein when the corresponding fluid flow controller allows the liquid to flow relative to the first side, the liquid thermally connects the first side to a heat source or a heat sink,
   wherein each of the at least two thermoelectric assemblies has a region corresponding to the thermoelectric assembly,
   wherein the at least two thermoelectric assemblies are selectively operable to heat the region corresponding to the thermoelectric assembly by the thermoelectric assembly transferring heat from the liquid via the first side to the region corresponding to the thermoelectric assembly via the second side, wherein the at least two thermoelectric assemblies are each operable independently from one another, and wherein the second side is in thermal communication with the region corresponding to the thermoelectric assembly and is configured to control the temperature of the region.

2. The seat system of claim 1, wherein the at least two thermoelectric assemblies are each in thermal communication with air within the region corresponding to the thermoelectric assembly.

3. The seat system of claim 1, wherein the at least two thermoelectric assemblies each comprises a plurality of thermoelectric elements, a liquid heat exchanger in thermal communication with the plurality of thermoelectric elements and configured to allow the liquid to flow through the liquid heat exchanger, and an air heat exchanger in thermal communication with the plurality of thermoelectric elements, the air heat exchanger configured to allow air to flow through the air heat exchanger.

4. The seat system of claim 1, wherein the at least two thermoelectric assemblies are selectively operable either to heat the region corresponding to the thermoelectric assembly by transferring heat from the liquid to the region corresponding to the thermoelectric assembly or to cool the region corresponding to the thermoelectric assembly by transferring heat from the region corresponding to the thermoelectric assembly to the liquid.

5. The seat system of claim 4, wherein the at least two thermoelectric assemblies are configured to deliver heating, cooling, or both heating and cooling to one or more occupants within the passenger compartment.

6. The seat system of claim 5, wherein each of the at least two thermoelectric assemblies operates in heating mode by pumping heat from the liquid to the air, and operates in cooling mode by pumping heat from the air to the liquid.

7. The seat system of claim 5, comprising at least one seat, wherein the one or more occupants are sitting in the at least one seat or behind the at least one seat.

8. The seat system of claim 1, wherein the liquid comprises water.

9. The seat system of claim 8, wherein the liquid further comprises ethylene glycol.

10. The seat system of claim 1, wherein the vehicle comprises an engine and the liquid comprises engine coolant.

11. The seat system of claim 10, wherein the vehicle further comprises a radiator, and the engine coolant flows through the radiator, the engine, and the at least one fluid conduit.

12. The seat system of claim 11, wherein the vehicle further comprises an auxiliary radiator, and the engine coolant flows through the radiator, the engine, the auxiliary radiator, and the at least one fluid conduit.

13. The seat system of claim 1, wherein the vehicle comprises a powertrain, and the liquid comprises a powertrain coolant.

14. The seat system of claim 1, wherein the vehicle comprises a battery and a heat exchanger attached to the battery, the liquid in thermal communication with the heat exchanger.

15. The seat system of claim 1, wherein the vehicle comprises a fuel tank and a heat exchanger attached to or encased within the fuel tank, the liquid in thermal communication with the heat exchanger.

16. The seat system of claim 1, wherein the one or more seat portions comprises one or more seat cushions.

17. The seat system of claim 1, wherein the one or more seat portions comprises one or more seat backs.

18. The seat system of claim 1, wherein the fluid conduit loop comprises a plurality of fluid conduits, each thermoelectric assembly in fluid communication with a fluid conduit corresponding to the thermoelectric assembly, each fluid conduit in fluid communication with the fluid conduit loop, each fluid conduit comprising an inlet side and an outlet side, the inlet side directing at least a portion of the liquid from the fluid conduit loop toward the thermoelectric assembly to flow through the thermoelectric assembly, the outlet side directing the portion of liquid away from the thermoelectric assembly into the fluid conduit loop, wherein the portion of the liquid flows out of the fluid conduit loop into an inlet side of a first fluid conduit corresponding to a first thermoelectric assembly of the plurality of thermoelectric assemblies, through the first thermoelectric assembly, and through an outlet side of the first fluid conduit back into the fluid conduit loop when the seat system is operating, and wherein, after flowing through the outlet side of the first fluid conduit back into the fluid conduit loop, at least a part of the portion of the liquid sequentially flows out of the fluid conduit loop into an inlet side of a second fluid conduit corresponding to a second thermoelectric assembly of the plurality of thermoelectric assemblies, through the second thermoelectric assembly, and through an outlet side of the second fluid conduit back into the fluid conduit loop when the seat system is operating.

19. The seat system of claim 18, wherein the fluid flow controller is positioned on the inlet side of each fluid conduit.

20. The seat system of claim 18, wherein at least another portion of the liquid flows through the fluid conduit loop while the portion of the liquid flows through the first conduit.

21. The seat system of claim 18, wherein the outlet side of the first fluid conduit corresponding to the first thermoelectric assembly is connected to the inlet side of the second fluid conduit corresponding to the second thermoelectric assembly via a continuous wall of the fluid conduit loop without other inlet or outlet sides connected to the continuous wall.

22. A climate control system for a passenger compartment of a vehicle, the climate control system comprising:

at least one fluid conduit loop configured to allow a liquid to flow in the at least one fluid conduit loop; and a plurality of thermoelectric assemblies, wherein at least two thermoelectric assemblies of the plurality of thermoelectric assemblies each have a first side and a second side and are configured to transfer thermal energy between the first side and the second side, wherein the at least two thermoelectric assemblies of the plurality of thermoelectric assemblies are in selective fluid communication with the liquid via a corresponding fluid flow controller of each of the at least two thermoelectric assemblies, the corresponding fluid flow controller configured to stop fluid flow of the liquid relative to the first side or to allow fluid flow of the liquid relative to the first side to place the first side in thermal communication with the liquid flowing through the at least one fluid conduit loop, wherein each of the at least two thermoelectric assemblies has a corresponding region within the passenger compartment, wherein the at least two thermoelectric assemblies are selectively operable to heat the corresponding region by the thermoelectric assembly transferring heat from the liquid via the first side to the corresponding region via the second side, wherein the at least two thermoelectric assemblies are each operable independently from one another, wherein the at least one fluid conduit loop is configured to selectively connect to a heat source or to a heat sink, wherein when the climate control system operates in a first heating mode, the fluid conduit loop is connected to the heat source with a first thermoelectric assembly of the at least two thermoelectric assemblies in thermal communication with the liquid via the corresponding fluid flow controller allowing fluid flow of the liquid relative to the first side of the first thermoelectric assembly and with a second thermoelectric assembly of the at least thermoelectric assemblies not in thermal communication with the liquid via the corresponding valve stopping fluid flow of the liquid relative to the first side of the second thermoelectric assembly, and wherein when the climate control system operates in a first cooling mode, the fluid conduit loop is connected to the heat sink with the first thermoelectric assembly in thermal communication with the liquid via the corresponding fluid flow controller allowing fluid flow of the liquid relative to the first side of the first thermoelectric assembly and with the second thermoelectric assembly not in thermal communication with the liquid via the corresponding valve stopping fluid flow of the liquid relative to the first side of the second thermoelectric assembly.

23. The climate control system of claim 22, wherein the at least two thermoelectric assemblies are selectively operable either to heat the corresponding region by transferring heat from the liquid to the corresponding region or to cool the corresponding region by transferring heat from the corresponding region to the liquid.

24. The climate control system of claim 22, wherein the vehicle comprises a headliner and at least one thermoelectric assembly of the at least two thermoelectric assemblies is located in the headliner.

25. The climate control system of claim 22, wherein the vehicle comprises one or more pillars and at least one thermoelectric assembly of the at least two thermoelectric assemblies is located in the one or more pillars.

26. The climate control system of claim 22, wherein the vehicle comprises a steering wheel and at least one thermoelectric assembly of the at least two thermoelectric assemblies is located in the steering wheel.

27. The climate control system of claim 22, wherein the vehicle comprises one or more seat cushions and at least one thermoelectric assembly of the at least two thermoelectric assemblies is located in the one or more seat cushions.

28. The climate control system of claim 22, wherein the vehicle comprises one or more seat backs and at least one thermoelectric assembly of the at least two thermoelectric assemblies is located in the one or more seat backs.

29. The climate control system of claim 22, wherein the at least one fluid conduit loop comprises at least one flow control element configured to connect the fluid conduit loop to the heat sink when the climate control system operates in the first heating mode and disconnect the fluid conduit loop from the heat source when the climate control system operates in the first cooling mode.

30. The climate control system of claim 22, wherein when the climate control system operates in a second heating mode, the fluid conduit loop is connected to the heat source with the first thermoelectric assembly in thermal communication with the liquid via the corresponding fluid flow controller allowing fluid flow of the liquid relative to the first side of the first thermoelectric assembly and with the second thermoelectric assembly in thermal communication with the liquid via the corresponding valve allowing fluid flow of the liquid relative to the first side of the second thermoelectric assembly.

31. The climate control system of claim 22, wherein when the climate control system operates in a second cooling mode, the fluid conduit loop is connected to the heat sink with the first thermoelectric assembly in thermal communication with the liquid via the corresponding fluid flow controller allowing fluid flow of the liquid relative to the first side of the first thermoelectric assembly and with the second thermoelectric assembly in thermal communication with the liquid via the corresponding valve allowing fluid flow of the liquid relative to the first side of the second thermoelectric assembly.

32. A climate control system for a passenger compartment of a vehicle, the climate control system comprising:

at least one fluid conduit loop configured to allow a liquid to flow in the at least one fluid conduit loop; and a plurality of localized temperature control assemblies selectively connectable to the at least one fluid conduit loop, each of the plurality of localized temperature control assemblies comprising a thermoelectric assembly and a flow control element, the thermoelectric assembly comprising a first side and a second side and configured to transfer thermal energy between the first side and the second side, wherein at least two of the plurality of localized temperature control assemblies are in selective thermal communication with the liquid via the flow control elements of each of the at least two localized temperature control assemblies being positioned along the fluid conduit loop, and the flow control elements configured to selectively connect each of the at least two localized temperature control assemblies to the fluid conduit loop by allowing fluid flow relative to the first sides of the thermoelectric assemblies of the at least two localized temperature control assemblies or disconnect each of the at least two localized temperature control assemblies from the fluid conduit loop by stopping fluid flow relative to the first sides of the thermoelectric assemblies of the at least two localized temperature control assemblies, wherein each of the at least two localized temperature control assemblies has a corresponding region within the passenger compartment, wherein each of the at least two localized temperature control assemblies are selectively operable to cool the corresponding region by the thermoelectric assembly transferring heat from the corresponding region via the second side to the liquid via the first side, and wherein each of the at least two localized temperature control assemblies are each operable independently from one another.

33. The climate control system of claim 32, wherein the vehicle comprises a headliner and at least one thermoelectric assembly of the at least two thermoelectric assemblies is located in the headliner.

34. The climate control system of claim 32, wherein the vehicle comprises one or more pillars and at least one thermoelectric assembly of the at least two thermoelectric assemblies is located in the one or more pillars.

35. The climate control system of claim 32, wherein the vehicle comprises a steering wheel and at least one thermoelectric assembly of the at least two thermoelectric assemblies is located in the steering wheel.

36. The climate control system of claim 32, wherein the vehicle comprises one or more seat cushions and at least one thermoelectric assembly of the at least two thermoelectric assemblies is located in the one or more seat cushions.

37. The climate control system of claim 32, wherein the vehicle comprises one or more seat backs and at least one thermoelectric assembly of the at least two thermoelectric assemblies is located in the one or more seat backs.

38. A method for controlling climate at selected regions within a passenger compartment of a vehicle, the method comprising:
   providing a climate control system comprising:
      at least one fluid conduit loop configured to allow a liquid to flow in the at least one fluid conduit loop; and
      a plurality of thermoelectric assemblies,
         wherein at least two thermoelectric assemblies of the plurality of thermoelectric assemblies each have a first side and a second side and are configured to transfer thermal energy between the first side and the second side,
         wherein the at least two thermoelectric assemblies of the plurality of thermoelectric assemblies are in selective thermal communication with the liquid via a corresponding fluid flow controller of each of the at least two thermoelectric assemblies, the corresponding fluid flow controller configured to stop fluid flow of the liquid relative to the first side or to allow fluid flow of the liquid relative to the first side to place the first side in thermal communication with the liquid flowing through the at least one fluid conduit loop,
         wherein when the corresponding fluid flow controller allows the liquid to flow relative to the first side, the liquid thermally connects the first side to a heat source or a heat sink,
         wherein each of the at least two thermoelectric assemblies has a corresponding region within the passenger compartment,
         wherein the at least two thermoelectric assemblies are selectively operable to heat the corresponding region by the thermoelectric assembly transferring heat from the liquid via the first side to the corresponding region via the second side,
         wherein the at least two thermoelectric assemblies are each operable independently from one another, and
         wherein the second side is in thermal communication with the region corresponding to the thermoelectric assembly and is configured to control the temperature of the region; and
   operating the at least two thermoelectric assemblies independently from one another to selectively control climate at the regions corresponding to the at least two thermoelectric assemblies.

39. The method of claim 38, wherein the at least two thermoelectric assemblies are selectively operable either to heat the corresponding region by transferring heat from the liquid to the corresponding region or to cool the corresponding region by transferring heat from the corresponding region to the liquid, and operating the at least two thermoelectric assemblies independently from one another comprises selectively heating, cooling, or both heating and cooling the regions corresponding to the at least two thermoelectric assemblies.

40. The method of claim 38, wherein the vehicle comprises one or more seat portions and at least one thermoelectric assembly of the at least two thermoelectric assemblies is located in the one or more seat portions.

41. The method of claim 38, wherein the at least two thermoelectric assemblies are each in thermal communication with air within the region corresponding to the thermoelectric assembly.

42. The method of claim 38, wherein the at least two thermoelectric assemblies each comprises a plurality of thermoelectric elements, a liquid heat exchanger in thermal communication with the plurality of thermoelectric elements, and an air heat exchanger in thermal communication with the plurality of thermoelectric elements, the method further comprising flowing the liquid through the liquid heat exchanger and flowing air through the air heat exchanger.

43. The method of claim 38, wherein the liquid comprises water.

44. The method of claim 43, wherein the liquid further comprises ethylene glycol.

45. The method of claim 38, wherein the vehicle comprises an engine and the liquid comprises engine coolant.

* * * * *